(12) United States Patent
Xu et al.

(10) Patent No.: US 8,705,184 B2
(45) Date of Patent: Apr. 22, 2014

(54) MULTI-PATH, MULTI-MAGNIFICATION, NON-CONFOCAL FLUORESCENCE EMISSION ENDOSCOPY APPARATUS AND METHODS

(75) Inventors: Chunhui (Chris) Xu, Ithaca, NY (US); Watt W. Webb, Ithaca, NY (US); Douglas S. Scherr, Scarsdale, NY (US); Dimitre Gueorguiev Ouzounov, Ithaca, NY (US); David R. Rivera, Ithaca, NY (US); Christopher M. Brown, Ithaca, NY (US); Demirhan Kobat, Ithaca, NY (US); David Huland, Hamburg (DE); Scott S. Howard, South Bend, IN (US)

(73) Assignee: Cornell University, Ithaca, NY (US)

( * ) Notice: Subject to any disclaimer, the term of this patent is extended or adjusted under 35 U.S.C. 154(b) by 172 days.

(21) Appl. No.: 13/314,478

(22) Filed: Dec. 8, 2011

(65) Prior Publication Data

US 2012/0140301 A1 Jun. 7, 2012

Related U.S. Application Data

(63) Continuation-in-part of application No. 12/742,562, filed as application No. PCT/US2008/083164 on Nov. 12, 2008, now Pat. No. 8,553,337.

(60) Provisional application No. 60/987,868, filed on Nov. 14, 2007, provisional application No. 60/987,270, filed on Nov. 12, 2007.

(51) Int. Cl.
*G02B 3/00* (2006.01)
*G02B 17/00* (2006.01)

(52) U.S. Cl.
CPC ...................................... *G02B 3/00* (2013.01)
USPC ............ 359/722; 359/730; 359/731; 359/736

(58) Field of Classification Search
USPC ......... 359/722, 726, 727, 730, 731, 733, 736, 359/793, 796
See application file for complete search history.

(56) References Cited

U.S. PATENT DOCUMENTS 6,721,101 B2 * 4/2004 Daniell ......................... 359/626

* cited by examiner

*Primary Examiner* — Jack Dinh
(74) *Attorney, Agent, or Firm* — William Greener; Bond, Schoeneck & King, PLLC

(57) ABSTRACT

An optical scanner, scanner apparatus, or scanner assembly, which may be particularly advantageous for use in a multiphoton microscope, includes a first drivable bending component, a second drivable bending component mounted perpendicularly to the first component, and at least one optical waveguide coupled one or both of the first and second bending components, wherein the at least one optical waveguide provides both a propagation path for a multiphoton excitation radiation delivery between a light source and a target and a multiphoton-induced emission radiation delivery between the target and a detector. A GRIN relay lens. A multiphoton microscope incorporating the scanner and the GRIN relay lens.

47 Claims, 15 Drawing Sheets

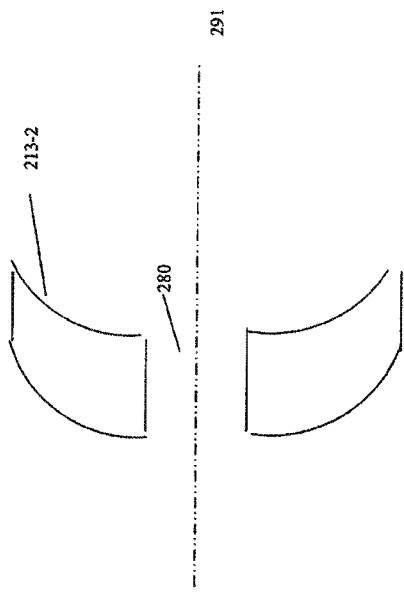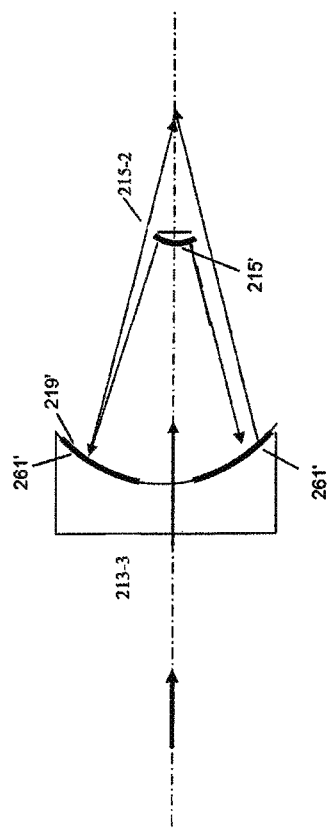
FIG. 4a
FIG. 4b

MULTI-PATH, MULTI-MAGNIFICATION, NON-CONFOCAL FLUORESCENCE EMISSION ENDOSCOPY APPARATUS AND METHODS

CROSS-REFERENCE TO RELATED APPLICATIONS

This application is a continuation-in-part of, and claims priority to, U.S. application Ser. No. 12/742,562 filed on May 12, 2010, which is a US national stage filing of PCT/US2008/083164 filed on Nov. 12, 2008, which claims priority to U.S. Provisional application Ser. No. 60/987,868 filed on Nov. 14, 2007, and to U.S. Provisional application Ser. No. 60/987,270 filed on Nov. 12, 2007, the subject matters of all of which are incorporated by reference herein in their entireties.

STATEMENT REGARDING FEDERALLY SPONSORED RESEARCH OR DEVELOPMENT

This invention was made with government support under Grant No. 1R01EB006736-01 and Grant No. 5-P41EB001976 sponsored by the National Institute of Biological Imaging and Bioengineering at the National Institutes of Health, and National Institute of Health/National Cancer Institute Grant R01-CA133148. The government has certain rights in the invention.

BACKGROUND OF THE INVENTION

1. Field of the Invention

Embodiments of the invention are most generally related to the field of fluorescence emission and collection and/or imaging and/or non-linear harmonic emission collection and/or imaging; collection and/or imaging optical apparatus/systems such as, but not limited to microscopes, endoscopes, and laparoscopes, operational component apparatus thereof, associated methods, and applications. More particularly, embodiments of the invention are directed to optical scanning component apparatus and imaging system components, and associated methods and applications of use.

2. Description of the Related Art

The multiphoton microscope was co-invented almost two decades ago by Dr. Watt Webb, a co-inventor of the present invention. Multiphoton microscopy (MPM), as is now well known, is a special kind of laser scanning microscopy that provided significant advantages over standard confocal microscopy. In confocal microscopy, one photon of high energy light (at, e.g., 488 nm) is used to excite a molecule to produce one photon of fluorescence. The light excites molecules in a relatively large region around the focal point. The use of high energy light could easily damage living tissue in the entire region of exposure. Furthermore, imaging depth was limited to about 50 microns ($\mu$) (about five cell layers).

In MPM, multiple lower energy photons (at, e.g., 780-800 nm, 960 nm, other suitable excitation wavelengths) impinge on a fluorescent target molecule simultaneously, producing one photon of fluorescence from the focal volume of the excitation field. Advantageously, MPM is safer and more efficacious than confocal microscopy for human use because of, e.g., limited site photo-toxicity and photo-damage to living tissue, imaging depths up to 500 to 1000 $\mu$m, and lower out-of-focus fluorescence background. Intrinsic fluorescence of certain tissue structures generated by the excitation field reduces or eliminates the need for dye (fluorophore) injection. There are other reasons known in the art. As a result, MPM provides the capability to acquire high contrast, high resolution images, without the need to use pinhole apertures or other spatial filtering elements, with reduced tissue photo-bleaching and photo-destruction that occur from repeated excitation.

The laser light used (typically femtosecond (fs) pulses) to generate multiphoton-induced excitation also supports the non-linear optical phenomenon known as harmonic generation. Second harmonic generation (SHG) (and higher-order harmonic generation) under multiphoton excitation can cause collagen and certain tissue structures such as microtubule bundles, nerves and cartilage, for example, to emit intrinsic SHG radiation.

The present inventors have recognized that various advantages and benefits could be realized by incorporating the principles of laser scanning microscopy into medical instruments such as surgical microscopes, and endoscope- and laparoscope-type apparatus for in-situ and in-vivo fluorescence and/or higher-order harmonic emission imaging and/or fluorescence and/or higher-order harmonic emission collection. In addition, advances made in the course of developing such medical instruments are useful in instruments designed for research or for industrial microscopy. In the medical realm, disease diagnosis has for a long time been, and continues to be, carried out by various biopsy procedures. A biopsy requires the physical removal of a (deep) tissue sample from a patient, sample analysis by a pathologist, and reporting, which may take from a few hours to several days or more. The ability to perform real time, in-situ and in-vivo endoscopy in combination with the diagnostic capabilities of fluorescence and harmonic-scattering-based imaging could significantly reduce the pain, time, and cost associated with conventional biopsy procedures and assist in disease diagnosis and the extent of tissue damage due to disease states. High resolution laser scanning endoscopy, laparoscopy, or surgical microscopy for sub-tissue, nerve, and cartilage examination offers advantages over the capabilities of current instruments. The ability to see nerves and collagen clearly would be especially valuable, for example, in nerve-sparring prostate surgery, bladder cancer treatment, maxillofacial and oral surgery, and other surgical and diagnostic applications for animals and humans.

Miniaturized instruments capable of confocal, optical coherence tomography (OCT), two-photon fluorescence (TPF), and second harmonic generation (SHG) imaging have been reported. The typical constituents of these devices include a miniaturized scanning mechanism and a lens assembly that is encapsulated in a protective housing with dimensions suitable for use in small spaces (e.g., in minimally invasive medical procedures) have been described; for instance, a probe outer diameter on the order of a few millimeters with a rigid length of several centimeters. Within these laser scanning microscopes (similarly, laparoscopes/boroscopes and other microscopes), various distal miniaturized scanners have been demonstrated, including resonant-based (e.g., Lissajous or spiral scan pattern) and non-resonant-based, cantilever fiber scanners, as well as microelectromechanical systems (MEMS) scanning mirrors. Of these scanners, the resonant-based spiral scanners are the most successful in terms of their miniaturized dimensions (e.g., OD$\approx$1 mm) and fast image acquisition speeds (e.g., 8 frames/s with 512×512 pixels per frame, $\approx$200 $\mu$m diameter FOV$_{xy}$); however, these resonant devices are fundamentally limited by non-uniform spatial coverage and sampling time in comparison to current miniaturized raster scanners. Current miniaturized raster scanners are, however, limited in terms of their physical dimensions and/or scan speeds. Le Harzic et al. has previously demonstrated a piezo-driven X-Y scanner (length=34 mm, width=1.9 mm) capable of a uniformly sampled $FOV_{xy}$ up to 420 µm by 420 µm, but this device is limited by its frame rate (i.e., 0.1 frames/s with 512×512 pixels per frame) (Le Harzic R, Weinigel M, Riemann I, Konig K, Messerschmidt B (2008) Nonlinear optical endoscope based on a compact two axes piezo scanner and a miniature objective lens, *Opt Express* 16:20588-20596). Slow image acquisition speeds are not ideal due to the motion artifacts typically faced in real-time in vivo clinical imaging environments. Additionally, although 2-D MEMS scanning minors with miniature dimensions (e.g., 750 µm×750 µm mirror size) have recently demonstrated fast line acquisition rates on the order of 1-3 kHz, the overall miniaturization of these MEMS scanners (i.e., their probe ODs) is limited by the die size of the actuator, which is typically 3 mm×3 mm.

Furthermore, in any scanning system there is a fundamental relationship between resolution (independent pixels) and the scanner range. It is often the case that the relationship between the output beam size and the number of resolvable points is fundamental and cannot be altered by external optics.

Efforts to date to improve endoscopic and laparoscopic imaging procedures and apparatus have focused on the laser scanning fluorescence excitation processes with little attention directed to improved systems and methods for acquiring, identifying, and analyzing the fluorescence, or to improved systems and methods to reduce the severity and invasiveness of existing procedures.

In-vivo laser scanning microscopy, including multiphoton microscopy (MPM), has become a valuable tool for the study of deep structures in intact animals. MPM through gradient index (GRIN) lens systems has been shown to be useful in relaying the excitation light and autofluorescence/second harmonic generation (SHG) emission to and from an external microscope deep into soft tissue. These studies have, however, been limited to short (<3 cm) GRIN systems for small animal use. With MPM showing great promise in the diagnosis of human diseases, many applications (e.g., lung, prostate, bladder, other, examination/diagnosis,) will require significantly longer GRIN systems.

In view of the problematic challenges and shortcomings associated with fluorescence emission (endoscopy, laparoscopy, and microscopy) imaging/collection apparatus and methods, the inventors have recognized the unfulfilled need for apparatus and methods that can address and solve these challenges and shortcomings, and others, in a practical, cost effective, and efficacious manner.

Embodiments of the invention are directed to apparatus and methods that address the aforementioned problems associated with current technology in this field.

SUMMARY

As used herein, the term "fluorescence emission" will be used to refer to laser-induced (for example, two-photon and higher-order fluorescence emission (induced, for example, via femtosecond laser radiation) as well as optical second harmonic generation (SHG) (but not excluding higher-order harmonic generation) from a target medium under conditions suitable to excite such fluorescence emission.

As used herein, the term "endoscope" refers to a 'flexible' housing-based apparatus and includes instruments used in medical procedures and in non-medical contexts, and the term "laparoscope" refers to a 'rigid' housing-based apparatus and includes instruments used in medical procedures and in non-medical contexts. A "microscope" refers in general to a benchtop microscope, a surgical microscope, or a microscope or laparoscope that includes apparatus for microscopic imaging, and includes medical instruments such as surgical microscopes, laparoscopes, and endoscopes, including pharyngoscopes, esophagoscopes, gastroscopes, duodenoscopes, enteroscopes, colonoscopes, sigmoidoscopes, cholangioscopes, rhinoscopes, antroscopes, laryngoscopes, bronchoscopes, nephroscopes, ureteroscopes, cystoscopes, gynoscopes, colposcopes, hysteroscopes, falloposcopes, culdoscopes, arthroscopes, thoracoscopes, mediastinscoes, coelioscopes, amnioscopes, angioscopes, otoscopes, and ventriculoscopes, as well as nonmedical instruments such as benchtop microscopes and boroscopes. Thus, reference to any one of the apparatus and/or associated methods and/or applications may apply to all and, therefore should not in every instance be limited to the one referred to.

As used herein "laser scanning microscopes" and "laser scanning microscopy" refer to all applicable laser-based microscope systems, including confocal systems and systems useful for two photon or multiphoton microscopy, as one in the art would understand.

Illustrative embodiments of the invention include, but are not limited to, an optical system disposed in, or at, a distal end of a fluorescence emission endoscope, an optical system module for use in, or with, a fluorescence emission endoscope, an optical waveguide-based fluorescence emission endoscopy system, and a method for remotely-controlled, multi-magnification imaging of a target or fluorescence emission collection from a target with a fluorescence emission endoscope apparatus.

An embodiment of the invention is an optical system disposed in, or at, a distal end of a fluorescence emission endoscope apparatus. The optical system includes an objective lens component disposed adjacent a distal end of the endoscope, wherein the objective lens component has a proximal surface that is only partially coated with a patterned coating that at least selectively reflects or transmits a target illumination or selectively transmits or reflects a target emission, and a distal surface that is only partially coated with the coating. According to an aspect, the target illumination is laser-emitted, IR bandwidth, fluorescence-excitation light. In an aspect, the target illumination is visible light, in combination with the IR fluorescence-excitation light. Accordingly, the target emission can be from visible light and/or from fluorescence emission. According to an aspect, the optical system incorporates a light pipe that transmits the target illumination and the target emission. In an aspect, the patterned coating on the proximal surface of the lens component is an annular, circumferential pattern. In a related aspect, the partially coated distal surface of the lens component has only a defined central region that is coated. According to an aspect, a central region of the distal surface of the lens component has a shape that provides a cavity in the distal surface of the lens. In another aspect, a distal lens is fixedly disposed in the cavity in the distal surface of the lens component. In a related aspect, at least a portion of a surface of the distal lens has a coating that at least transmits or reflects at least the illumination light or the emission light. According to various aspects, the proximal surface of the lens component has a spherical or an aspheric shape, and the distal surface of the lens component has a partially flat surface, at least a partially spherical surface shape, or at least a partially aspheric surface shape. According to an aspect, the optical system includes a collimating optical component disposed adjacent the proximal surface of the lens component. In an aspect, an optical cover is disposed at least over the cavity in the distal surface of the lens component. An index-matching medium may be disposed immediately adjacent at least a portion of the distal surface of the lens component. The optical system may be a target illumination and non-imaging target emission-collection system for quantifying fluorescence emission. The optical system may further include, by reference, other attributes referred to in other embodiments of the invention that are not expressly recited in conjunction with the instant embodiment.

Another embodiment of the invention is directed to an optical system disposed in, or at, a distal end of a fluorescence emission endoscope apparatus, that includes an objective lens component having a clear central aperture, disposed adjacent a distal end of the endoscope, wherein the objective lens component transmits at least a visible light spectrum or a fluorescence emission from a target. According to an aspect, at least a portion of at least a proximal surface or a distal surface of the lens component has a coating to achieve a desired optical effect. According to an aspect, a distal lens is fixedly disposed in the clear aperture of the lens component. According to various aspects, the proximal surface of the lens component has a spherical shape or an aspheric shape, and the distal surface of the lens component has a flat surface, at least a partially spherical surface shape, or at least a partially aspheric shape. According to an aspect, the optical system includes a collimating optical component disposed adjacent a proximal side of the lens component and aligned along an optical axis passing through the clear aperture of the lens component. In an aspect, an optical cover is disposed over at least the clear aperture on the distal surface of the lens component. According to an aspect, the optical system is a target illumination and non-imaging, target emission-collection system. The optical system may further include, by reference, other attributes referred to in other embodiments of the invention that are not expressly recited in conjunction with the instant embodiment.

Another embodiment of the invention is directed to a dual magnification optical system disposed in, or at, a distal end of a fluorescence emission endoscope apparatus. The optical system includes a high-magnification target illumination path that transmits light in a near infra-red (IR) spectral region from a fluorescence emission-exciting target illumination source to a target; a dual, integrated low-magnification target illumination path and fluorescence emission path that transmits light in a visible spectral region from a visible light illumination source to the target and, which, transmits fluorescence emission from the target towards a proximal region of the endoscope, respectively. According to an aspect, the dual, integrated low-magnification target illumination path and fluorescence emission path further comprises an integrated, low-magnification visible target emission path that transmits visible emission from the target towards the proximal region of the endoscope. According to an aspect, the optical system further comprises an objective lens component fixedly disposed adjacent a distal end of the endoscope, wherein only a portion of the lens component transmits the high-magnification target illumination and only a different portion of which reflects the high-magnification target illumination; further wherein at least a portion of the lens component forms at least a part of the dual, integrated low-magnification target illumination path and the fluorescence emission path. In a related aspect, the portion of the lens component that transmits the fluorescence emission-exciting target illumination consists of an uncoated region of a proximal surface of the lens component and an uncoated region of a distal surface of the lens component, further wherein the different portion that reflects the high-magnification target illumination consists of a coated region of the proximal surface of the lens component and a coated region of the distal surface of the lens component. According to an aspect, the portion of the lens component that forms at least a part of the dual, integrated low-magnification target illumination path and fluorescence emission path comprises at least a portion of the uncoated region of the distal surface of the lens component and at least a portion of the coated region of the proximal surface of the lens component. In an aspect, the system further comprises a collimating lens disposed in the fluorescence emission-exciting target illumination path adjacent the lens component. According to an aspect, a distal lens is disposed immediately adjacent at least a portion of the distal surface of the lens component. In a related aspect, the distal lens is disposed immediately adjacent the coated region of the distal surface of the lens component. According to an aspect, the optical system is a target illumination and non-imaging, target emission-collection system. The optical system may further include, by reference, other attributes referred to in other embodiments of the invention that are not expressly recited in conjunction with the instant embodiment.

An embodiment of the invention is directed to an optical system module for use in, or with, a fluorescence emission endoscope apparatus. The optical system module includes a housing assembly having a proximal end adapted to be connected to a distal end of the fluorescence emission endoscope; an objective lens component disposed adjacent a distal end of the housing, wherein the objective lens component has a proximal surface that is only partially coated with a patterned coating that at least one of selectively reflects and transmits a target illumination and selectively transmits and reflects a target emission, and a distal surface that is only partially coated with the coating. According to an aspect, the housing incorporates a light pipe that transmits the target illumination and the target emission. In a related aspect, the housing comprises a transparent seal disposed in the proximal end of the housing. According to an aspect, the housing encloses a gaseous environment. According to an aspect, the optical system module further comprises a scanner disposed adjacent the proximal end of the housing, wherein the scanner has a target illumination input adapted to receive target illumination light from a target illumination source and a target illumination output. In a related aspect, the target illumination output comprises an optical waveguide having a distal output end. The lens component forms a conjugate image of the distal end of the waveguide at the target. According to an aspect, the optical system module further comprises a collimating lens disposed intermediate the distal end of the waveguide and the proximal surface of the lens component. The optical system module may further include, by reference, other attributes referred to in other embodiments of the invention that are not expressly recited in conjunction with the instant embodiment.

Another embodiment of the invention is directed to an optical system module for use in, or with, a fluorescence emission endoscope apparatus, that includes a removably connectable housing assembly having a proximal end adapted to be connected to a distal end of the fluorescence emission endoscope apparatus, and an objective lens component having a clear central aperture, disposed adjacent a distal end of the housing, wherein the objective lens component transmits at least a visible light spectrum or a fluorescence emission from a target. According to an aspect, at least a portion of at least a proximal surface or a distal surface of the lens component has a coating to achieve a desired optical effect. According to an aspect, the optical system module further includes a distal lens fixedly disposed in the clear aperture of the lens component. In various related aspects, the proximal surface of the lens component has a spherical or an aspheric shape, and the distal surface of the lens component has a flat surface, an at least partially spherical surface shape, and an at least partially aspheric surface shape. According to an aspect, an optical cover is disposed over at least the clear aperture on the distal surface of the lens component. In a related aspect, the housing comprises a transparent seal disposed in the proximal end of the housing. The housing may enclose a gaseous environment. According to an aspect, the optical system module further includes a scanner disposed adjacent the proximal end of the housing, wherein the scanner has a target illumination input adapted to receive target illumination light from a target illumination source and a target illumination output. In an aspect, the target illumination output comprises an optical waveguide having a distal output end. The lens component forms a conjugate image of the distal end of the waveguide at the target. According to an aspect, the optical system module further comprises a collimating lens disposed intermediate the distal end of the waveguide and the proximal surface of the lens component. The optical system module may further include, by reference, other attributes referred to in other embodiments of the invention that are not expressly recited in conjunction with the instant embodiment.

An embodiment of the invention is directed to an optical waveguide-based, fluorescence emission endoscopy system that includes one or more optical waveguides having a distal end; and an optical system disposed in, at, or adjacent the distal end of at least one of the one or more optical waveguides, wherein the optical system includes an objective lens component having a proximal surface that is only partially coated with a patterned coating that at least selectively reflects or transmits a target illumination or selectively transmits or reflects a target emission, and a distal surface that is only partially coated with the coating. The endoscopy system may further include, by reference, other attributes referred to in other embodiments of the invention that are not expressly recited in conjunction with the instant embodiment.

An embodiment of the invention is directed to a method for remotely-controlled, multi-magnification imaging of a target with an endoscope assembly. The method involves the steps of providing an optical system disposed in a distal end of the endoscope assembly; providing a high-magnification target illumination path that transmits pulsed light in a near infrared (IR) spectral region from a high-magnification target illumination source through only a designated portion of the optical system and out of the distal end of the endoscope assembly; and, providing a dual, integrated low-magnification target illumination path and fluorescence emission path as well as a visible back-scattered light path that transmits light in a visible spectral region from a visible light illumination source through a different designated portion of the optical system and out of the distal end of the endoscope assembly to the target and, which, transmits fluorescence emission from the target through the different designated portion of the optical system towards a proximal region of the endoscope assembly, respectively. The method may further include, by reference, other attributes referred to in other embodiments of the invention that are not expressly recited in conjunction with the instant embodiment.

An embodiment of the invention is directed to an optical scanner. The embodied scanner may be particularly advantageous for use in a laser scanning microscope. An exemplary optical scanner includes a first drivable bending component having a first component bending axis and a first component driven bending axis direction; a second drivable bending component having a second component bending axis and a second component driven bending axis direction, wherein the first and second drivable bending components are coupled such that their respective driven bending axis directions are different; and at least one optical waveguide coupled to at least one of the first and second drivable bending components parallel to the first and second component bending axes, such that the at least one waveguide can be moved in at least one of the driven bending axis directions. In various non-limiting, exemplary aspects:

- the at least one optical waveguide provides both a propagation path for a) a laser excitation radiation delivery between a light source and a target and b) a laser scanning-induced emission radiation delivery between the target and a detector;
- the at least one optical waveguide always provides at least a propagation path for a laser excitation radiation delivery between a light source and a target, but may not facilitate a propagation path for a laser scanning-induced emission radiation delivery between the target and a detector;
- the first and second drivable bending components are multi-layer piezo-actuators;
- the first and second drivable bending components are coupled such that their respective driven bending axis directions are perpendicular;
- the at least one optical waveguide is an optical fiber mounted to the at least one of the first and second drivable bending components;
- the at least one optical fiber has a distal, light-emitting end that extends past a respective attachment surface of the first and second drivable bending components;
- the distal, light-emitting end of the optical fiber has a taper, which may be an adiabatic taper;
- the distal, light-emitting end of the optical fiber has an aspherical profile;
- the at least one optical fiber has a distal, light-emitting end having a radius of curvature, r;
- the at least one optical fiber has a distal, light-emitting end having a radius of curvature, r, where 4 µm≤r≤6 µm;
- the distal, light-emitting end of the optical fiber includes a spherical or an aspheric lens;
- the at least one optical fiber has a proximal end that provides an input from a light source, further comprising at least one optical coupler and at least one output signal optical waveguide coupled to the at least one optical fiber via the at least one optical coupler;
- the at least one optical coupler is a double-clad coupler;
- the distal, light-emitting end of the optical fiber is operationally characterized by a driven displacement in the first component driven bending axis direction equal to or greater than one millimeter (1 mm) and a driven displacement in the second component driven bending axis direction equal to or greater than 0.5 mm;
- the distal, light-emitting end of the optical fiber operationally characterized by a resonantly-driven displacement in the first component driven bending axis direction and a non-resonantly-driven displacement in the second component driven bending axis direction;
- the at least one optical fiber is a double-clad fiber;
- the at least one optical fiber is an air-core photonic bandgap fiber (PBGF);
- the at least one optical fiber is a high-order-mode fiber (HOMF);
- the at least one optical fiber is a standard single-mode fiber (SSMF);
- the optical scanner further includes a stiffening component attached to one of the first and second drivable bending components and an extending region of the at least one optical fiber;

the optical scanner further includes a scanner housing in which the scanner is disposed;

the optical scanner further includes an objective optical system disposed in a distal region of the scanner housing;

the optical scanner further includes a gradient index (GRIN) lens system disposed in a rigid housing coupled to a distal end of the scanner housing;

the GRIN lens system includes a plurality of GRIN relay lenses and a GRIN objective lens;

the optical scanner includes at least two optical waveguides coupled to at least one of the first and second drivable bending components parallel to the first and second component bending axes, wherein the at least two optical waveguides always provide a propagation path for a laser excitation radiation delivery between a light source and a target, and may further always provide a propagation path for a laser scanning-induced emission radiation delivery between the target and a detector;

the at least two optical waveguides are optical fibers having respective distal, light-emitting ends that extend past a respective attachment surface of the first and second drivable bending components;

the at least two optical fibers have proximal ends that provide inputs from a light source, further comprising at least two respective optical couplers and at least two respective output signal optical waveguides coupled to the at least two optical fibers via the at least two respective optical couplers.

the optical scanner further includes a connector connected to the proximal ends of the least two optical fibers, and a connector connected to the proximal ends of the at least two respective output signal optical waveguides, wherein the scanner is a modular component and is detachably connectable to an optical excitation source and a signal light detector;

the respective distal ends of the at least two optical fibers have different extending (z-axis) distances;

the respective distal ends of the at least two optical fibers have a radius of curvature, r;

the respective distal ends of the at least two optical fibers have a radius of curvature, r, where $4\ \mu m \leq r \leq 6\ \mu m$;

the respective distal ends of the at least two optical fibers have an aspherical profile;

the respective distal ends of the at least two optical fibers have a taper, which may be an adiabatic taper;

the respective distal ends of the at least two optical fibers may include a spherical or an aspheric lens;

the distal region of the at least two optical fibers are an $M \times N$ ($M \geq 1$, $N \geq 2$) monolithic array;

the optical scanner is characterized by having multiple foci in both a lateral (y)-direction and an axial (z)-direction;

the monolithic array comprises a $1 \times N$ array, where $N=10$ optical fibers;

the respective distal ends of the at least two optical fibers have an aspherical curvature;

the respective distal ends of the at least two optical fibers have a radius of curvature, r;

at least two of the respective distal ends of the at least two optical fibers have different radii of curvature, thereby providing a plurality of focal planes.

An embodiment of the invention is a microscope comprising an optical scanner as disclosed herein.

An embodiment of the invention is an endoscope including an optical scanner as disclosed herein.

An embodiment of the invention is a laparoscope comprising an optical scanner as disclosed herein.

Certain embodiments described herein take advantage of the fact that in the multiphoton microscopy embodiments of the invention, the fluorescence emission excitation field is typically in the near IR ($\sim$700 nm$<\lambda \leq 1.3\mu$) spectrum; thus the excitation wavelength can be easily separated from the substantially shorter fluorescence emission wavelengths and the visible light ($\sim$400 nm$\leq \lambda \leq$700 nm) for viewing at low magnification. Furthermore, since the 3D resolution of laser scanning imaging results entirely from the scanned laser excitation, the fluorescence emission collection optical system requires only the capability to provide efficient emitted signal collection, facilitating the use of a simple, large aperture lens rather than a highly corrected objective lens. The non-confocal design of the high-magnification optical system provides added advantage for imaging deep in tissue because the problem of image obstruction from a concentric fiber scanner is reduced, as is the concern that the excitation fiber will not provide sufficiently efficient signal collection and/or transmission.

The various apparatus and method embodiments will be applicable to both flexible and rigid microscopes, as well as to general laser scanning and optical harmonic generation fluorescence emission processes.

In various exemplary applications, the apparatus and method embodiments described herein can be used to provide in vivo, in situ microscopic imaging of the infrastructure and bio-chemistry of tissue as a shortcut to diagnostic information that ordinarily would be later acquired by a pathologist's hematoxylin and eosin (H&E) stained absorption microscopy of fixed thin slices of tissue obtained by biopsy. The embodied apparatus and methods of the present invention may be utilized during surgery or during precursor diagnostics to delineate boundaries of malignant tumors or to recognize particular disease or damaged states, which will inform their prompt treatment, and for monitoring past treatment results. The embodied apparatus and methods may be used to identify and recognize organs and anatomical structures to be protected from injury during surgery, such as nerve bundles, microtubule bundles, and other structures. The embodied apparatus and methods will allow accurate spatial target discrimination, and permit non-imaging quantification of fluorescence emission from target volumes.

It will be appreciated by those skilled in the art that quantitative fluorescence emission collection as well as fluorescence emission images may be collected at various angular and rotational orientations of the optical systems according to various embodiments, as known in the art for conventional endoscopic, laparoscopic, and other microscopic imaging.

BRIEF DESCRIPTION OF THE DRAWINGS

The accompanying drawings illustrate various exemplary and illustrative embodiments and aspects of the invention. In the drawings:

FIGS. 4a and 4b are schematic drawings of alternative aspects of an objective lens component according to illustrative aspects of the invention;

DETAILED DISCUSSION OF CERTAIN DESCRIPTIVE, ILLUSTRATIVE, AND EXEMPLARY EMBODIMENTS OF THE INVENTION

Embodiments of the invention pertain generally to laser scanning, fluorescence emission microscopy systems and methods, and components, and applications thereof.

Figure 1:
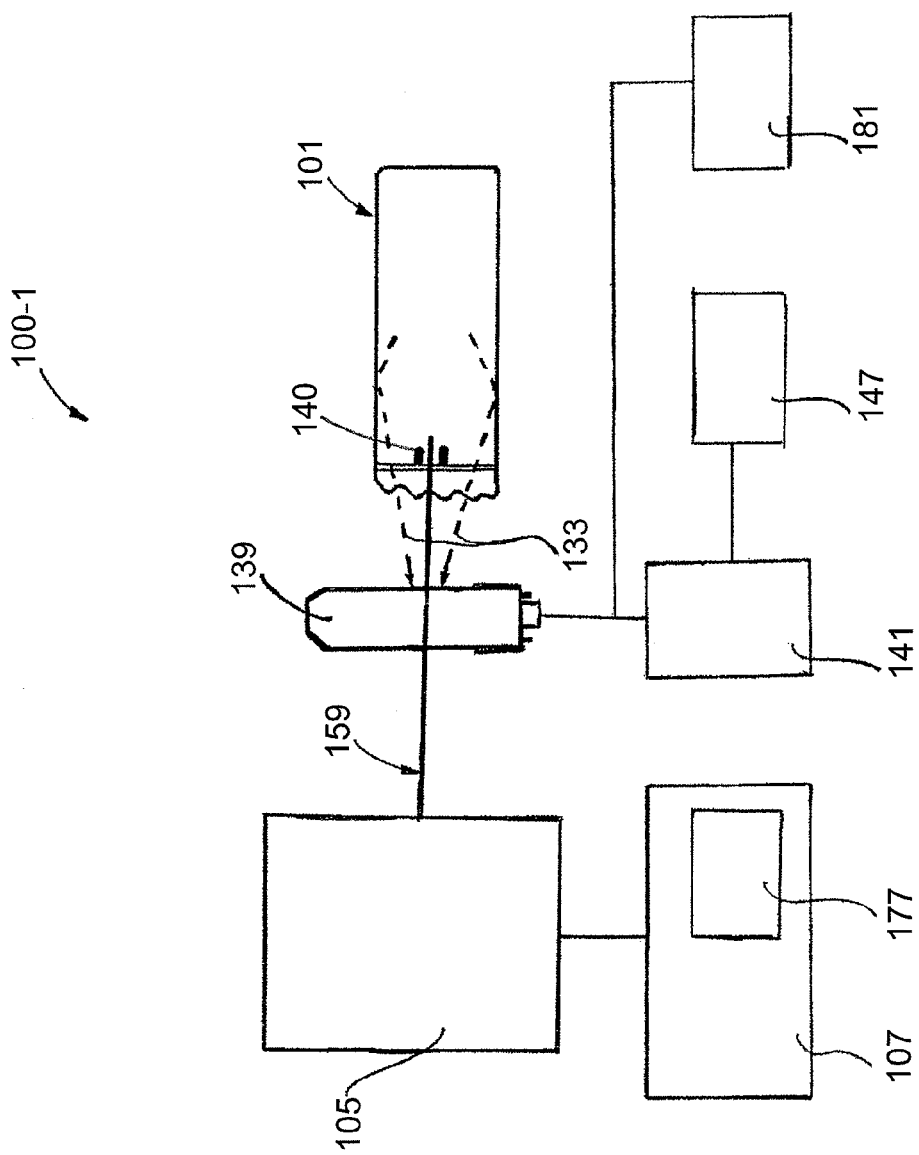
FIG. 1 is a schematic drawing of an endoscopy system, showing various illumination, control, detection, and analysis components including the distal end of a coaxial endoscope incorporating an optical system according to an illustrative embodiment of the invention.

FIG. 1 shows a schematic diagram of a coaxial endoscope system 100-1 that is shown with a distal segment 101 that incorporates an optical system embodied by the invention. As described herein, the distal segment can be that of an endoscope or alternatively, may be a biopsy needle. The system is coaxial because, as shown, an optical fiber 159 that provides near IR target excitation light is coaxially surrounded, in part, by a light transmitting interior of the distal segment 101. The fluorescence emission endoscopy system 100-1 includes an illumination platform 105 that includes a suitable fluorescence emission excitation source such as a femtosecond, pulsed laser and a source of visible target illumination. An illumination platform control module 107 provides, for example, pulse shape control, beam expansion, spatial filtration, spectral phase control, modulation, and other control functions for the target illumination sources. Light source control module 107 may also include wavelength source control module 177 to adjust and switch wavelengths generated by the IR source. The system thus has at least a dual wavelength band target illumination capability that in conjunction with the optical system described herein, can provide remotely-controlled, multi-magnification fluorescence emission imaging and signal detection. As further shown in FIG. 1, a detector component 139 is provided for collecting fluorescence emission and other signal light (collectively, 133) from the target (not shown). The detector component 139 may be a photomultiplier tube (PMT) or other appropriate detector mechanism or imager that recovers visible signal light as well as fluorescence emission for non-imaging or imaging applications. An optical scanner 140 is shown disposed in the distal segment 101 according to an exemplary embodiment described in further detail below. The system also includes a detection control module 181 to control detection and collection of signal light from distal segment 101, a target analysis module 147, and a computer-controlled display device 141.

Figure 2:
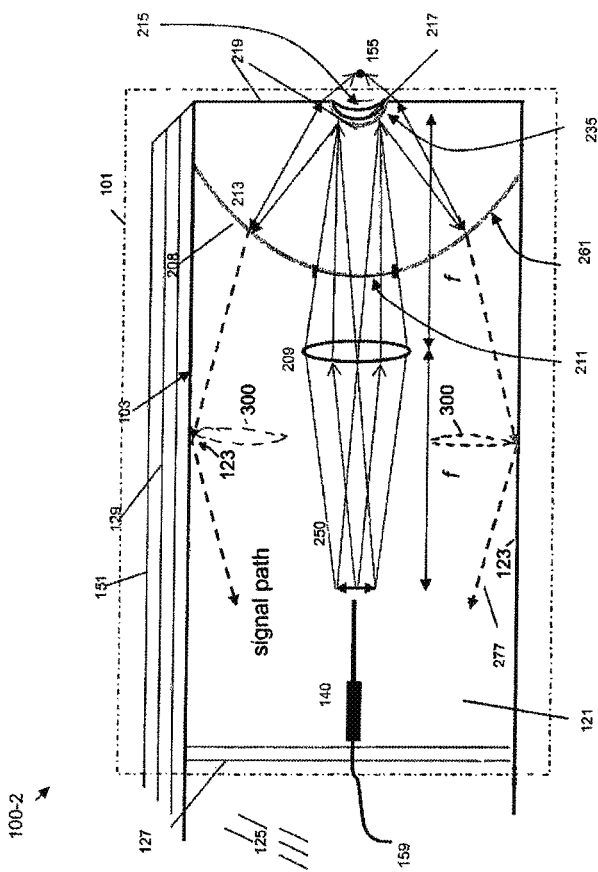
FIG. 2 is a side, cross sectional, schematic view of the distal segment of an endoscope incorporating an optical system in accordance with an illustrative embodiment of the invention.

FIG. 2 provides an illustration 100-2 of the distal segment 101 according to an exemplary embodiment of the invention. In the aspect shown, distal segment 101 represents the terminal, distal end of a micro-endo scope for imaging a target 155.

As shown, an objective lens component 213 is fixedly disposed in a terminal, distal endoscope segment 101. The objective lens component has a proximal surface 208 having a circumferentially-patterned dichroic coating as shown by the bolded line 261. A central region 211 of the proximal surface 208 is uncoated or may be anti-reflection coated. The lens component 213 has a distal surface 219 that is concave in a central region and otherwise having a different curvature (including flat) out to the periphery of the lens. The concave central region thus forms a finite cavity 217 in the central region of the distal surface. The concave region of the distal surface also has the dichroic coating as shown by the bolded line 235. A fiber 159 delivers short, high-repetition pulses of 780 nm target illumination 250 to scanner 140. A collimating lens 209 is disposed along the central longitudinal axis of the distal segment 101 and directs the scanned illumination 250 to the uncoated or anti-reflection coated central region 211 of the lens component. The light is reflected from the dichroic-coated central region 235 of the distal surface of the lens back towards the circumferentially-coated region 261 of the proximal surface. The light is then refracted out through the uncoated region of the distal surface of the lens to illuminate the target 155. The dichroic coating on the lens component is designed to also transmit visible light that is used to illuminate the target and which is reflected/scattered from the target as visible signal light.

In the illustrative embodiment of FIG. 2, the optical system optionally includes a distal lens 215 that is disposed in the cavity 217 in the distal surface 219. The distal lens is uncoated and aids in the low magnification, large field of view, visible imaging of the target described further below. It will be appreciated, however, that the distal surface of the objective lens component 213 will provide a simple, large aperture for efficient signal collection, since the 3D resolution of multiphoton imaging results entirely from the scanned laser excitation. In an alternative aspect as shown, optional lens elements 300 (shown in dotted lines) can be added to further enhance the collection efficiency for signals.

Upon suitable excitation, the target emits multiphoton fluorescence or second harmonic generation. This fluorescence emission 277 is collected by the lens component 213 and propagates along a fluorescence emission light path within the distal segment 101 towards a detector (not shown) to provide a high-magnification, high-resolution fluorescence emission image of the target.

The illumination may be remotely controlled to provide visible target illumination. The visible illumination will pass through 209, 211, 235 and optionally 217, forming a low magnification, wide field view of the target. The visible light reflected from the target is collected by the distal lens 215 and the lens component 213 and propagates along a visible emission light path within the distal segment 101 towards a detector (not shown) to provide low-magnification, wide field of view image of the target.

It will be appreciated that the pattern arrangement of lens surface coatings, the optical characteristics of the lens/lenses, the optical system layout, and other attributes of the embodiments can be varied without departing from the scope of the invention. The embodiment provides a multi-magnification, multi-integrated-optical path, and integrated dual-imaging optical component, optical system for fluorescence emission/visible imaging. FIGS. 4a and 4b show illustrative alternative aspects of the optical system involving an objective lens component and a distal lens. For example, FIG. 4a shows a side cross sectional profile of an annular lens component 213-2. A clear central aperture 280 surrounds the optical axis 291 of the lens. A dichroic coating can be patterned on various regions of the lens to accomplish the desired dual imaging function of the lens. In FIG. 4b, distal lens 215-2 is disposed along the optical axis adjacent the distal surface 219' of the lens component 213-3. As shown, the proximal surface 215' of distal lens 215-2 and a peripheral region 261' of distal surface 219' of lens component 213-3 are coated to reflect incident IR target excitation light after it passes through the uncoated central region of lens 213-3. The lens system will provide integrated multi-path, multi-magnification fluorescence/visible imaging as described herein above.

As further shown in FIG. 2, one embodiment of the distal segment 101 may incorporate a light pipe 103 having a reflecting inner wall 123 that seals an air core of the distal segment. In the aspect shown, an outer cladding layer 151 surrounds the light pipe. A transmissive cover 127 is disposed in a proximal end of the distal segment 101. The cover 127 separates the low index air core of the distal segment 101 from a higher-index medium 125 of the endoscope body and provides support for the scanner 140. The cover may be coated to better transmit the fluorescence emission 277. The higher index medium 125 of the endoscope body is surrounded by a lower index outer cladding to form a light guiding pipe for the signal fluorescence. Suitable light pipe designs are well known to people skilled in the art. The endoscope body may be flexible or rigid.

In another embodiment, the distal segment 101 may incorporate additional lenses 300 positioned in-between the cover 127 and the objective lens 213. In the exemplary embodiment shown in FIG. 2, lenses 300 may be constructed in an annular form with a central region designed for the passage of the excitation light and an outer region for the collection of the fluorescence. Lenses 300 may increase the fluorescence collection efficiency of the endoscope system.

The air core 121 of segment 101 may accommodate other simple fiber scanners. Suitable fibers include, but not limited to, air core photonic bandgap fibers, higher order mode fibers, microstructure fibers and large core broadband fibers. Other probes may be used depending upon the type of scanner and cladding layer 151 employed. Additionally, the laser beam transmitted via optical fiber 159 may also be scanned with oscillating minors or micro-electromechanical systems (MEMS) and the like.

Figure 3:
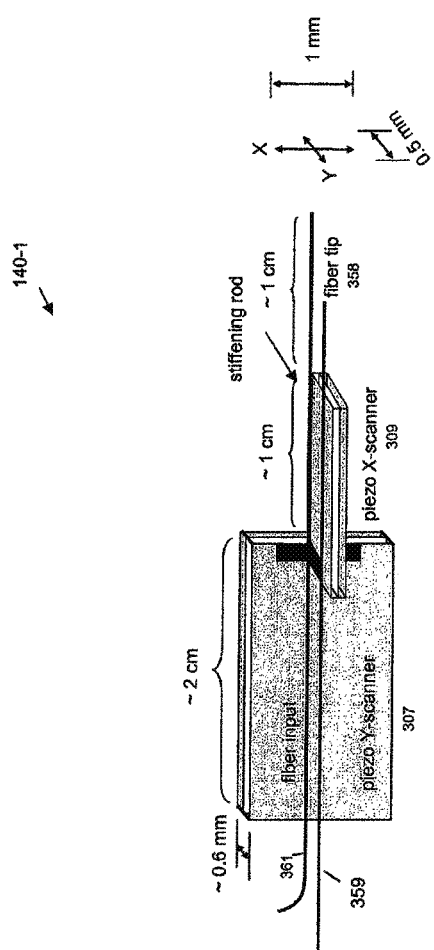
FIG. 3 is a schematic illustration of a fiber X-Y optical scanner according to an exemplary embodiment of the invention.

FIG. 3 illustrates an exemplary fiber X-Y optical scanner 140-1 (equivalently, scanner apparatus or scanner assembly). According to an exemplary aspect, the scanner comprises two piezo bending elements, a piezo X-axis scanner 309 and a piezo Y-axis scanner 307, to drive the IR raster scan of the fiber tip 358. The optical scanner 140-1 includes a first fiber 359 for transmitting the near IR excitation light and high-magnification signal light, and a second fiber 361 for transmitting the visible target illumination, locating the excitation light focus, and low-magnification viewing. Both fibers are disposed on the same (X) scanner and each has a different overhang length as shown. The fiber tip 358 will typically be conjugately imaged onto the target by an objective optical system (not shown). The fast (X-) axis scanner 309 will be driven resonantly, while the slow (Y-) axis scanner 307 will be driven non-resonantly (see examples below). Exemplary physical dimensions of the scanner and the scan ranges are indicated in the figure.

Fluorescence imaging deep in tissue may be performed using a gradient refractive index (GRIN) lens as reported in the art. An optional GRIN lens may be incorporated in the coaxial optical system 100-1 as a distal attachment near distal lens 215 using additional optical geometries.

As mentioned above, a high refractive index medium 125 helps to provide low loss propagation of the fluorescence emission 277 to a detection platform 139 at the proximal end of the endoscope or other diagnostic device. Typical refractive index values can range from approximately 1.58 to 1.73. Additionally, a flexible, low refractive index tube 129 can be concentrically disposed around the light pipe 103 to assist in positioning the distal endoscope end.

In an exemplary aspect, the light pipe 103 is approximately 5 mm in diameter, but other diameters may be practical. For example, 8 mm diameter systems may be used in diagnosing and monitoring treatment of bladder cancer by endoscope entry thorough the ureter. In addition to urological applications, laparoscopic tools for prostate examination, cancer and other surgeries may also utilize the system and method of the present invention. Further, in colonoscopy procedures, large diameter flexible endoscopes may provide color sensitive low magnification video imaging of the tissue to guide the fluorescence emission imaging. Similarly, small diameter systems may be used in optical biopsy environments.

It will be further appreciated that various protective external shells that accommodate both rigid and flexible endoscopes can be incorporated with the disclosed embodiments of the invention.

Figure 5:
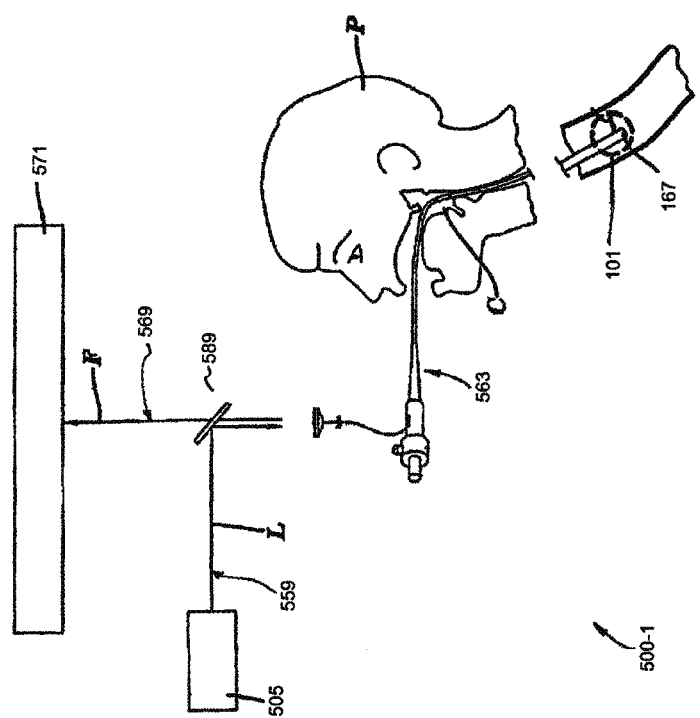
FIG. 5 is a schematic drawing of an endoscopy application according to an illustrative embodiment of the invention.
Figure 6:
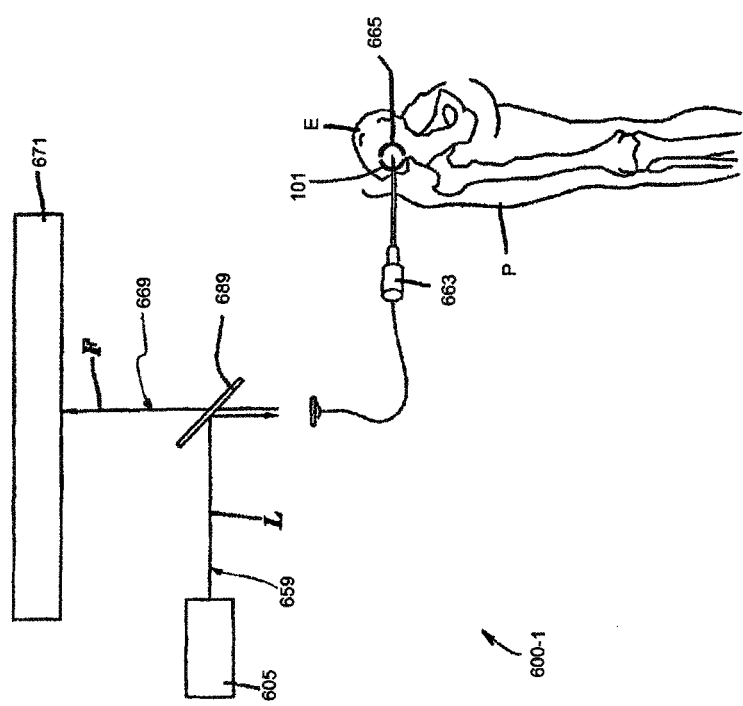
FIG. 6 is a schematic drawing of an endoscopy/needle biopsy application according to an illustrative embodiment of the invention.

FIGS. 5 and 6 show schematic views of two application environments in which the apparatus and method embodiments of the present invention may be used. The coaxial endoscopy system of the present invention performs fluorescence imaging, processing, and measurements of intrinsic fluorescence of a target as embodied in various medical endoscope and optical biopsy needle architectures.

FIG. 5 shows an endoscope arrangement 500-1 in accordance with the present invention, while FIG. 6 shows an optical biopsy needle arrangement 600-1 in accordance with the present invention. FIGS. 5 and 6 are presented to illustrate how the distal optics assembly of the present invention may be used in a number of clinical settings.

Referring to FIG. 5 (with reference to FIG. 1 as described above), an endoscope arrangement 500-1 includes a laser light source 505 that produces laser illumination L, which is transmitted to distal segment 101 through optical fiber 559. The distal segment 101 is housed in endoscope 563. The distal end of endoscope 563 is passed, for example, into the mouth of patient P through cavity C which, in this case, is the esophagus. Fluorescence emission F and scattered visible light are detected and transmitted by the segment 101 as described herein above and are passed through dichroic minor 589 and through detection path 569 into spectroscopic and/or imaging detection equipment 571 to provide a high magnification, high spatial resolution image using the fluorescence emission and a low magnification, low spatial resolution image using the scattered visible light.

Spectroscopic and/or imaging detection equipment 571 may include the detection platform 139 (shown in FIG. 1), including a PMT or other detection device, and a computer based video display 141 for detection and digital transmission to a computer for image formation and display.

Another embodiment of the present invention is based on penetration of tissue itself with either at least one conventional optical fiber or with an optical biopsy needle. Optical needle biopsy uses sub-mm diameter needles for light pathways. Surgical needle biopsy may be used as a diagnostic procedure, for example, in lung cancer and breast cancer diagnoses. The needle may be guided by CT scanning to direct the needle to the desired locations. Biopsy tissue is removed and is subjected to H&E staining for absorption microscopy. A sub-mm diameter biopsy needle may be too small to permit optical imaging but may facilitate femtosecond laser transmission through the needle bore and collection of the fluorescence emission back through the needle, allowing quantitative measurement of emission spectra, which may be used as a diagnostic tool to identify structures (e.g., collagen) by SHG and metabolic states by intensity of nicotinamide adenine dinucleotide (NADH). Quantitative correlation of the intrinsic fluorescence spectra of tissue generated in MPM may be compared to biopsy specimens as when using the system and method of the present invention in an endoscopic, laparoscopic, or other surgical microscopy environment.

In the optical biopsy needle application illustrated in FIG. 6, the needle incorporating an optical system in its distal end as disclosed herein is inserted into the tissue to sample the autofluorescence of the tissue at the end of the needle. The distal segment of the needle can function as a hypodermic syringe that may be inserted into the tissue as needed. Alternatively, the distal segment can be configured to abut the surface of the tissue being imaged. With multiphoton excitation, the focal volume at the end of the needle where fluorescence is excited is well defined. Alternatively, a bundle-type needle could be used to illuminate a larger tissue volume. In performing biopsies of dense tissue cancers, such as breast or liver cancer, the needle endoscope can be used to examine fluorescence along insertion pathways. In contrast to conventional biopsies, which generally require time-consuming tissue fixing and staining procedures, the optical biopsy with multiphoton excited fluorescence spectroscopy provides immediate diagnostic spectral data as the needle is inserted and moved within the patient.

As further shown in FIG. 6, (with reference to FIG. 1), an optical biopsy needle arrangement 600-1 includes laser light source 605 that produces laser illumination L, which is transmitted to distal segment 101 through optical fiber 659. In the biopsy needle arrangement, distal segment 101 is housed in the bore of optical biopsy needle 663. The distal end of optical biopsy needle 663 is passed, in this example, through the skin of patient P and into pelvis E. Multiphoton fluorescence F and scattered visible light are detected and transmitted by the optical system as described above and are passed through dichroic minor 689 and through detection path 669 into spectroscopic and/or imaging detection equipment 671 to provide a high magnification, high spatial resolution image using the multiphoton fluorescence and a low magnification, low spatial resolution image using the scattered visible light.

Spectroscopic and/or imaging detection equipment 571 may include detection platform 139 (shown in FIG. 1), including a PMT or other detection device, and a computer based video display 141 for detection and digital transmission to a computer for image formation and display.

These form aspects of the coaxial endoscopy system of the present invention can also be carried out in combination where an endoscope is inserted into a body cavity of a patient to provide a route for fibers to reach an internal surface of a body cavity from which the fibers can be inserted into a tissue material to sample its successive layers. For example, in the search for the onset of cancer in the wall of the colon, the tissue has about 5 layers, each with its own characteristic optical properties and autofluorescence. Successive optical probing of each layer can distinguish the different layers and recognize their changes by disease. These forms of multiphoton medical imaging may be used to replace traditional biopsy assays by imaging inside a body cavity or solid tissue to provide immediate evaluation and treatment adjustment with local anesthesia on an outpatient basis. The apparatus and methods of the present invention activate a tissue material by applying radiation to promote a simultaneous multiphoton excitation of the tissue to emit an intrinsic fluorescence characteristic. The intrinsic fluorescence is compared to fluorescence emitted by exciting healthy tissue under the same conditions, and the results are compared to determine if the examined tissue is potentially diseased.

Figure 7:
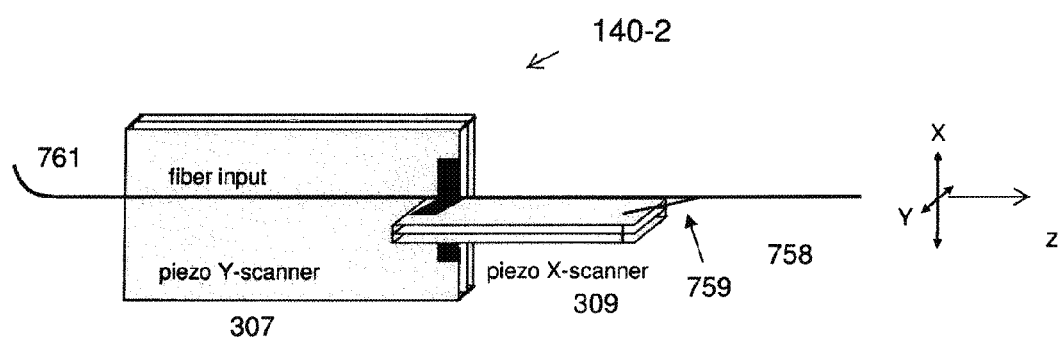
FIG. 7 is a schematic illustration of a fiber X-Y optical scanner according to an exemplary aspect of the invention.

FIG. 7 shows another exemplary aspect of an optical scanner 140-2. In contrast to scanner 140-1 illustrated in FIG. 3, scanner 140-2 includes a single optical waveguide 761 in the form of, but not limited to, an air-core photonic bandgap fiber (PBGF) that provides both a) a propagation path for laser scanning excitation radiation delivery between a light source (not shown) and a target (not shown) and b) a laser scanning-induced emission radiation delivery propagation path between the target and a detector (not shown). Other fiber types may include, but are not limited to, standard single mode fiber (SSMF), double-clad optical fiber, large mode area fiber (LMAF), and high-order-mode fiber (HOMF). Appropriately designed fibers may propagate both visible viewing- and IR excitation-light to a target and also provide a propagation path for fluorescence emission light from the target, and back-reflected visible light. As shown in FIG. 7, the optical fiber 761 is attached to the surfaces of both the piezo X-bending element 309 and the piezo Y-bending element 307 (although attachment to only one or the other may be used as well as various methods and means for attachment as are well known in the art (e.g., glue). A stiffening rod 759 is attached between the surface of the piezo X-bending element and the fiber to stiffen the fiber in the Y-direction to break the degeneracy of the resonant frequencies of the two axes. The use of certain types of optical fiber or waveguide structures may eliminate the need for, or use of, a stiffening element.

In the embodied aspect, the commercially available PBGF has a mode field diameter of ~5 μm and an outside diameter of ~125 μm, to deliver femtosecond laser scanning excitation pulses at ~780 nm for imaging autofluorescence and SHG from the target. The dispersion of the PBGF is designed such that the pulses will be negatively chirped at the output to account for the normal dispersion of a GRIN relay/objective lens (discussed in detail below). Because of the bandgap guiding mechanism, an individual PBGF is only suited for a relatively narrow spectral range (~50 nm). When wavelength tuning is desired, such as acquiring an excitation-emission matrix, the optical fiber should be able to deliver pulses over a broad wavelength range (e.g., 200~300 nm). Higher-order mode fiber (HOMF), developed at Cornell University, propagates light in a higher-order spatial mode. The HOMF can deliver pulses over a spectral bandwidth of 200 to 300 nm. Starting with a fixed wavelength fiber laser, the HOMF can tune the excitation wavelength over a substantial wavelength range; i.e., the delivery fiber can also serve as the element for wavelength tuning. Thus an all fiber system (fiber laser, laser wavelength tuning, and fiber delivery) can be realized.

Figure 8:
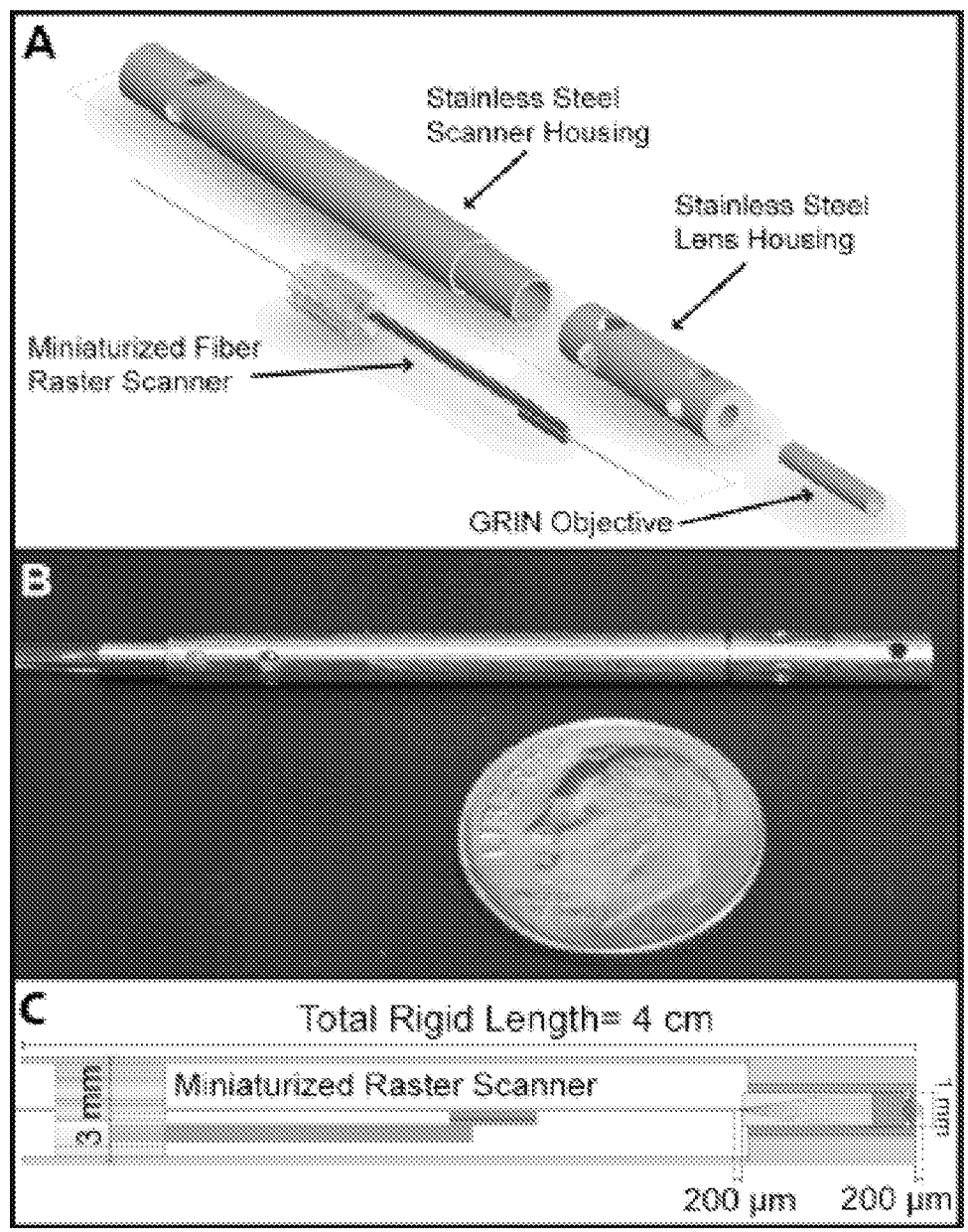
FIGS. 8a-c show, respectively, a) the mechanical assembly of an exemplary raster scanning, laser scanning microscope; b) a photo of a prototype microscope; and c) the optical path of the internal components of the distal end of the microscope, according to illustrative aspects of the invention.

FIGS. 8a-c show, respectively, a) the mechanical assembly of a 3 mm OD, 4 cm long raster scanning microscope 800-1 including optical scanner 140-2; b) a photo of a prototype; and c) the optical path of the internal components of the distal end of the microscope.

Figure 9:
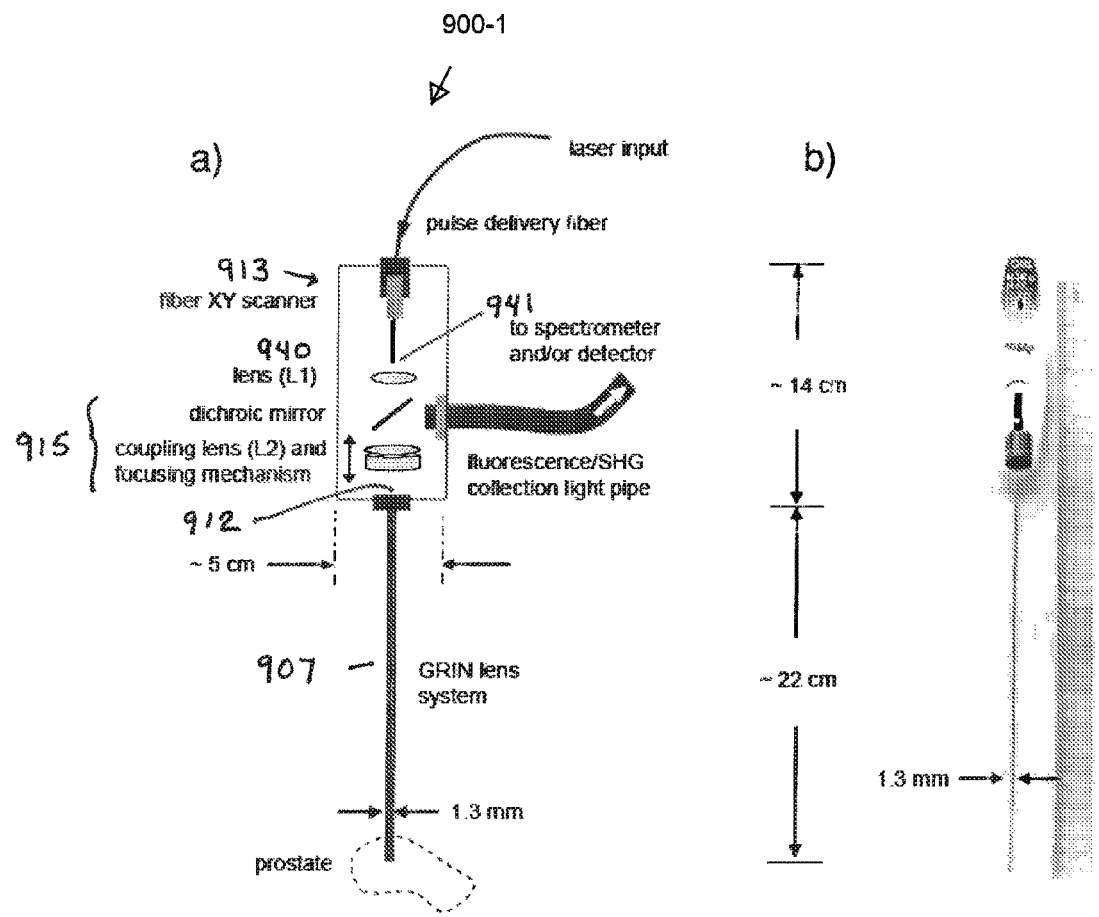
FIG. 9a illustrates an exemplary laser scanning GRIN microscope for laser scanning imaging and spectroscopy that is particularly suitable for prostate cancer detection, therapy monitoring, and prostate needle biopsy guiding, according to an exemplary aspect of the invention.
FIG. 9b shows a conventional prostate-needle biopsy gun for comparison.

FIG. 9a illustrates an exemplary laser scanning GRIN microscope 900-1 for laser scanning imaging and spectroscopy for prostate cancer detection, therapy monitoring, and prostate needle biopsy guiding, to demonstrate an exemplary application of the embodied technology. The microscope has physical dimensions similar to a conventional prostate-needle biopsy gun (as shown in FIG. 9b), with a long and thin GRIN relay lens 907 in place of the biopsy needle. As further illustrated in FIG. 9a, the front-viewing head-piece 913 of the microscope includes a fiber optical scanner 940 as embodied and variously disclosed herein and a lens system L1/L2 915, which images the tip 941 of the delivery fiber so that lateral motion of the fiber tip corresponds to scanning of the focal spot at the input face 942 of the GRIN lens. L1 and L2 provide a magnification of 2×, so that the focal spot at the GRIN lens input will be ~10 µm in diameter. The large 10 µm focal spot allows a lower NA GRIN relay lens, which avoids the fluorescence background from the GRIN lens material, nonlinear pulse distortion, and material damage.

Because the resonantly driven fiber tip displacement is sinusoidal in time, the beam dwell time will be shortest at the center of the image. Thus the scan field of the fiber tip is advantageously rectangular (~1.0(x)×0.5(y) mm as illustrated in FIG. 7), with the resonantly driven x-axis corresponding to the long side. After the 2× magnification by L1 and L2, only the middle portion of the resonantly scanned x-axis is coupled into the GRIN relay lens, which has a diameter of ~1.0 mm. By utilizing only the 'linear' portion of the sinusoidal displacement, the variation in pixel dwell time can be limited to +/−15%, which can be easily compensated for by data processing software. The combination of the fiber optical scanner and the optical system can generate ~100 resolution spots per scanning line, which is ideally matched to a 500×500-pixel image (i.e., 5 pixels/resolution).

Figure 10:
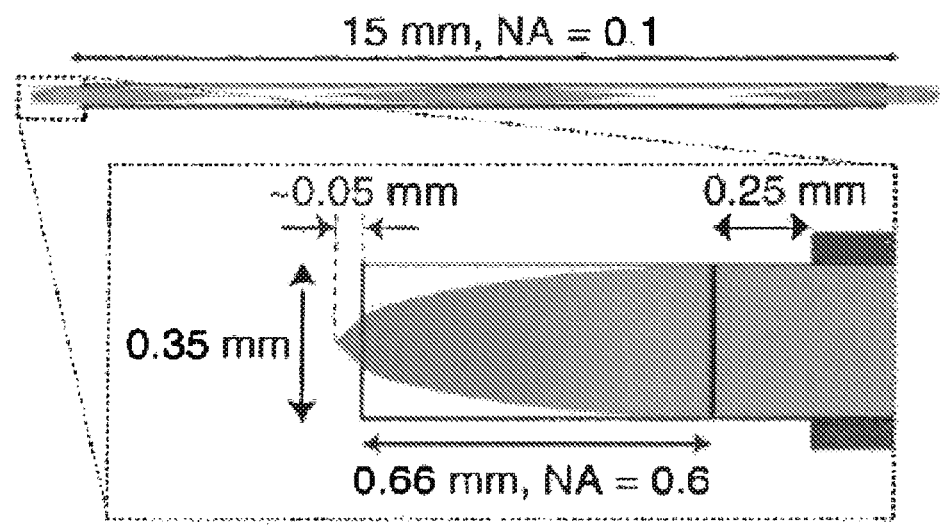
FIG. 10 illustrates a GRIN objective and relay lens for a laser scanning microscope imaging system that was used to acquire preliminary experimental data, according to an illustrative aspect of the invention.

GRIN lenses use a negative gradient in the refractive index of glass from the center of the lens to the outside edge to bend and focus light. GRIN lenses are characterized by a length, or pitch, and a numerical aperture (NA). The pitch of a GRIN lens determines how many internal images are formed within the lens. A 0.25-pitch lens focuses a parallel beam incident on the front surface of the lens to a point on the back surface. A lens of pitch 1 forms an upright image on the back surface, with an internal, inverted image plane located at one-half the length of the lens. FIG. 10 illustrates a GRIN objective and relay lens for a laser scanning microscope imaging system that was used to acquire preliminary experimental data. Detailed design parameters are shown in the figure.

There are a variety of optical configurations for the embodied GRIN lens microscope. A ¾ pitch relay lens was used in the configuration shown in FIG. 9a. This particular design provides convenience for fine focus adjustment. By moving the coupling lens L2 (FIG. 9a) using a microstepper or piezomotor, a scan range of hundreds of microns can be obtained without moving the GRIN lens. For efficient power transmission, the NA of the GRIN relay lens was matched to that of L2. Given the 2× magnification and an NA of the air-core fiber of ~0.2, the relay GRIN had a NA ~0.1. The microscope 900-1 has a total GRIN relay lens length of ~30 cm and a diameter of ~1 mm. Taking into account the thin metal sheath that protects the GRIN relay lens, the GRIN "needle" has an overall diameter of ~1.3 mm. The illustrated GRIN lens microscope is similar in length and diameter to an 18 gauge prostate needle biopsy gun providing a highly desirable characteristic when used together with existing TRUS guiding instrumentation. A GRIN relay lens that satisfies the design parameters can be readily made by commercial vendors. Because of the periodic behavior of a GRIN lens, an integer multiple of ½-pitch length can be inserted into the GRIN relay lens to obtain the desired length. Although a monolithic GRIN relay lens of the desired length is the most convenient for a microscope (GRIN lenses are commercially available in lengths of up to several tens of centimeters), the GRIN relay lens can be made of several discrete GRIN lenses, which provides flexibility for the prototyping process, and the use of existing low-cost, off-the-shelf, GRIN lenses. The design of the relay lens 907 consisted of five pieces of GRIN lenses, all 1 mm in diameter. The input section was ¾ pitch long and the other four pieces were 1-pitch GRIN at 4.7 mm length. The input section converts the focused laser spot into a collimated beam at the output end. Scanning of the focused spot at the entrance results in scanning of the collimated beam angle at the other end. The 1-pitch GRIN lenses then relay the angle scanning to the back aperture of the GRIN objective lens, which converts the angle scanning back to the spatial scanning of a focused spot. The five-piece lens system was assembled in a stainless steel tube with approximately 1.3 mm outside diameter, providing automatic optical alignment and mechanical protection of the GRIN lenses. The GRIN microscope was designed to provide a spatial resolution of 1-2 µm and a field of view (FOV) of ~200 µm at the excitation wavelength of ~780 nm.

An exemplary GRIN objective with a high NA for achieving a high spatial resolution is further shown in FIG. 10. The GRIN objective lens has a length slightly less than ¼-pitch to provide a working distance of several hundred microns. One concern common to the design of GRIN lenses is aberration. It is well known that the optical aberration accumulates in GRIN lenses of long pitches. Taking into account the long (4.75 pitches) relay lens used in our prototype microscope, we selected a GRIN objective having a NA of 0.5. The axial resolution of the GRIN objective is significantly worse than a regular microscope objective because of the spherical aberration. Nonetheless, an axial resolution of less than 25 µm can be expected based on our prior experimental results. The FOV is inversely proportional to the NA of the GRIN objective. Thus there is a compromise between FOV and spatial resolution. With an NA of 0.5, a FOV of 200 µm can be obtained with our microscope. Advantageously, the modular headpiece design (FIG. 9a) configuration can accommodate a variety of GRIN relay and objective lenses. Several GRIN lens ("needle") systems of different NAs can be designed having the same outside dimensions; therefore, the GRIN 'needles' can easily be interchanged, similar to a hypodermic needle that is commonly used with a syringe. A set of e.g., three GRIN needles could provide the necessary coverage for both high magnification (small FOV) and low magnification (large FOV) applications.

One potential complication for laser scanning excitation through the GRIN lens is pulse broadening due to dispersion. In our prototype, the material dispersion of the GRIN lens was made similar to that of 22 cm of glass. The material dispersion can be compensated by appropriate fiber design, or simply using a prism-pair dispersion compensator.

Figure 11:
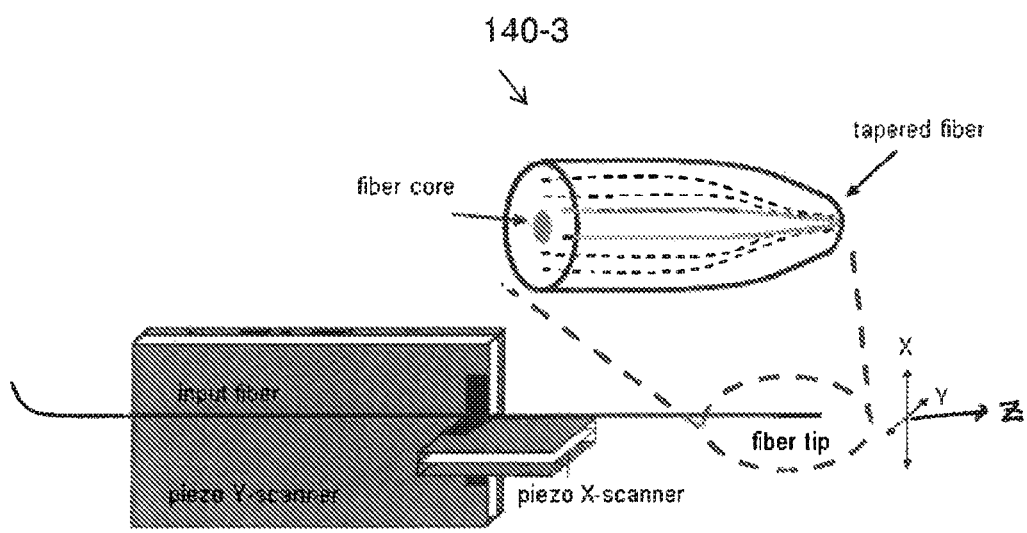
FIG. 11 schematically shows an optical scanner fiber having a tapered distal region, according to an illustrative aspect of the invention.

In any fiber-tip scanning system there is a fundamental relationship between the number of resolvable points (independent pixels) and the scanner range. The number of pixels in a line of a tip-scanned image is determined by the ratio of the distance of the tip movement (i.e., tip scanning range) to the beam size at the tip (e.g., the mode field diameter of the fiber at the output). For an output mode field diameter of 5 µm, an image with 200×200 independently resolvable pixels would require a tip scanning range of ~1 mm. It is desirable to achieve the maximum number of resolvable pixels with a given tip scanning range. This is particularly important for medical laser scanning microscopy when a large mode area fiber (e.g., with a mode field diameter of ≈25 µm for reducing fiber nonlinearity) is used to deliver the excitation pulse to the sample. Furthermore, the required demagnification necessary to achieve micrometer or less spatial resolution due to the large fiber tip size also presents a significant challenge for miniaturization of the distal optics. The relationship between the output beam size and the number of resolution spots is fundamental and cannot be altered by external optics. Thus one must reduce the output beam size in order to achieve a larger number of independent pixels per image without increasing the scanning range of the tip. According to an optical scanner aspect 104-3 as illustrated in FIG. 11, the end of the fiber is shaped (tapered) so that the output beam size is reduced to a smaller size. The shaping process can be done with a simple thermal tapering process or by using more sophisticated approaches such as e-beam or ion-beam etching. A variety of fiber types can be used to form the shaped fiber scanner, including standard single mode fiber (SSMF), polarization maintaining fiber, large mode area fiber, double clad fiber, and other as disclosed herein. The fiber may be tapered adiabatically during the manufacturing process so that the propagation loss through the taper is insignificant. As the fiber core size is decreased, the numerical aperture (NA) of the fiber at the output (i.e., the divergence angle of the beam at the tapered tip) will proportionally increase. The shaped fiber approach is simple and convenient to implement in a microscope as embodied herein, and reduces the beam size at the output of the delivery fiber without sacrificing the performance of the delivery fiber. In addition, the smaller output beam size from the fiber reduces the required demagnification ratio to achieve micrometer or less spatial resolution at the sample, greatly facilitating the miniaturization of the distal optics.

Alternatively (or in combination with shaping), a miniature lens can be fabricated at the tip of the fiber (see FIG. 14*a*-inset upper right, showing a micrograph of a fiber lens fabricated with a radius of curvature of 4 µm) using laser processing tools to further increase the FOV. The lens may be an aspheric lens. Thus any or all of the fibers may be tapered or not, and may be lensed or not.

A significant technical challenge for laser-based endoscopy is imaging speed. For in-vivo applications, a high frame rate is usually necessary for reducing motion artifacts and procedure throughput. Imaging speed is also fundamentally limited by the signal-to-noise ratio requirement, i.e., the pixel dwell time must be long enough to detect a sufficient number of photons. Simultaneous illumination of multiple points (i.e., parallelized image acquisition) has been demonstrated in microscopy to increase the imaging speed. For example, multiphoton, multi-foci microscopy (MMM) has been successfully applied to MPM, and Nipkow disc based multi-point illumination systems have been used in confocal microscopy. In addition, a line scanning system has been used in both multiphoton and confocal microscopy. Due to the bulk optics and opto-electronics components involved in their implementations, applying similar concepts to a microscope used in miniaturized contexts such as endoscopy or laparoscopy, presents a challenging problem. We solve this problem according to an aspect of the embodied invention with a multi-fiber optical scanner approach to enable a microscope with simultaneous multi-point scanning and detection.

Figure 12:
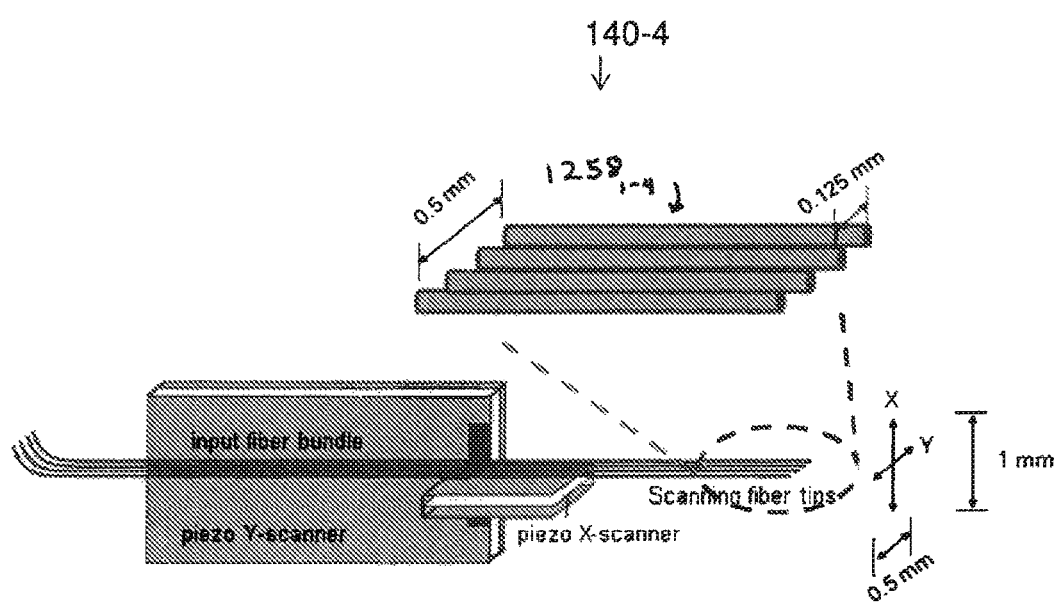
FIG. 12 schematically shows a multi-fiber scanner, according to an exemplary aspect of the invention.

A schematic of an exemplary multi-fiber optical scanner 140-4 is shown in FIG. 12. Four scanning fibers $1258_{1-4}$ are shown, however, a fewer or greater number of fibers may be used. The fibers each have an outside diameter of 0.125 mm, and are arranged into a one-dimensional ribbon (see inset). The resonant frequency along the smaller, y-axis dimension of the fiber ribbon will be approximately the same as that of a single fiber. Thus, a hybrid resonant/non-resonant fiber scanner can be achieved, similar to that of the single-fiber scanners 140, 140-2 as discussed above. As before, a variety of fiber types can be used to form the multi-fiber scanner, including standard single mode fiber (SSMF), large mode area fiber (LMAF), double clad fiber, tapered fiber, lensed fiber, etc, to enhance the detection efficiency and minimize the pixel crosstalk. Similar to that of a typical tip-scanning setup, the tip of the fiber ribbon is imaged by the optical system to the focal plane of the objective (not shown) so that lateral (y-axis) motion of the ribbon tip corresponds to the scanning of the four simultaneous foci. The generated signal (e.g., fluorescence or harmonic generation) will be collected by the illumination fiber ribbon, and detected with four separate detectors (e.g., PMTs, not shown) or one detector array. Because four foci are simultaneously illuminated and detected, a four-fold increase in image acquisition rate can be expected without any reduction in signal-to-noise ratio. Furthermore, each individual fiber within the ribbon scans a rectangular area (e.g., 0.125 mm by 0.5 mm as shown in FIG. 12), significantly reducing the required scanning range along the larger, x-axis dimension of the fiber ribbon. Such a large reduction in the required scan range will greatly facilitate the miniaturization of the fiber scanner. The distal ends of the fibers can be tapered and/or lensed as described above.

It is also possible to scan both the x- and the y-axes resonantly, thus allowing for a Lissajous scan using a 4×1 ribbon scanner or other fiber array arrangement.

Figure 13:
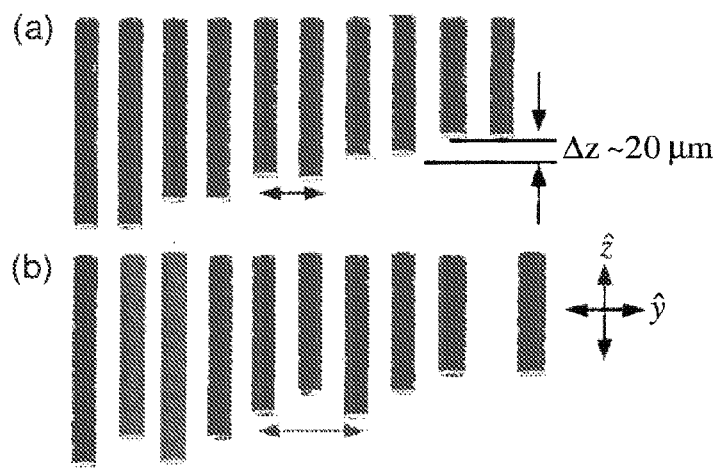
FIG. 13 illustrates: a) a fiber optical scanner array having multiple foci in both the y- and z-directions, in which the lateral y-scan equals the fiber-to-fiber distance; b) in which the lateral scan range is twice the fiber-to-fiber distance to reduce the effect of the tilt in the z-stack, according to illustrative aspects of the invention.

In another aspect, the fiber ends can be placed at different z-axis positions as illustrated in FIGS. 13*a, b*. After imaging by the distal optics, the fibers will then scan multiple axial planes (e.g., four planes in FIG. 13*a*) simultaneously. Since the relative positions of the fiber tips along the z-axis are known, the relative positions of the axial planes inside the sample are easily determined. Thus depth resolved imaging is possible without any mechanical motion control along the z-axis.

The large separation distance between the fiber cores in the fiber ribbon (e.g., 0.125 mm in FIG. 12) will allow the embodied multi-fiber scanner to perform well in a weakly scattering sample (or at a shallow depth in a strongly scattering sample) in addition to a non-scattering sample (or at the surface of a strongly scattering sample).

Figure 14:
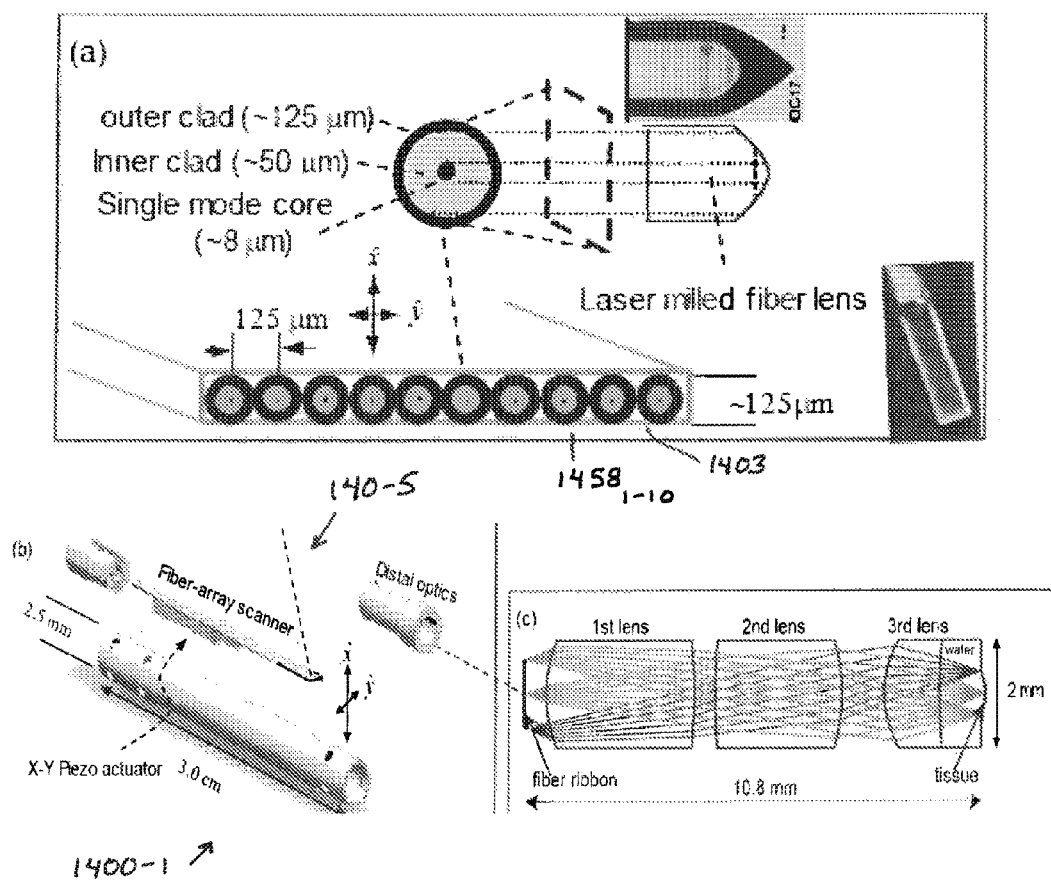
FIG. 14 illustrates: a) a schematic of the distal end of a monolithic fiber array scanner, including milled lenses (spherical or aspheric) on the fiber ends; b) the mechanical and optical design of the rigid distal end of a microscope; and c) a cross sectional optical schematic of a water immersion, three element compound microscope objective lens, according to exemplary and illustrative aspects of the invention.

Another illustrative, exemplary aspect of the invention is shown schematically in FIGS. 14*a-c*. As will be appreciated, the instant, non-limiting aspect advantageously enables a multiphoton microscope that can produce diagnostically meaningful images from intrinsic fluorescence signals without excessive photodamage, a good SNR as is required for diagnostic imaging and, a fast frame rate to overcome motion artifacts and advance procedural throughput in a clinical environment.

The microscope 1400-1 comprises a novel lensed-fiber-array scanner 140-5 including a novel mechanism to achieve remote axial sectioning where multiple z-axis sections can be obtained simultaneously without any mechanical motion at the distal end, in a modular system design to realize, among other benefits, bedside multiphoton imaging.

Figure 15:
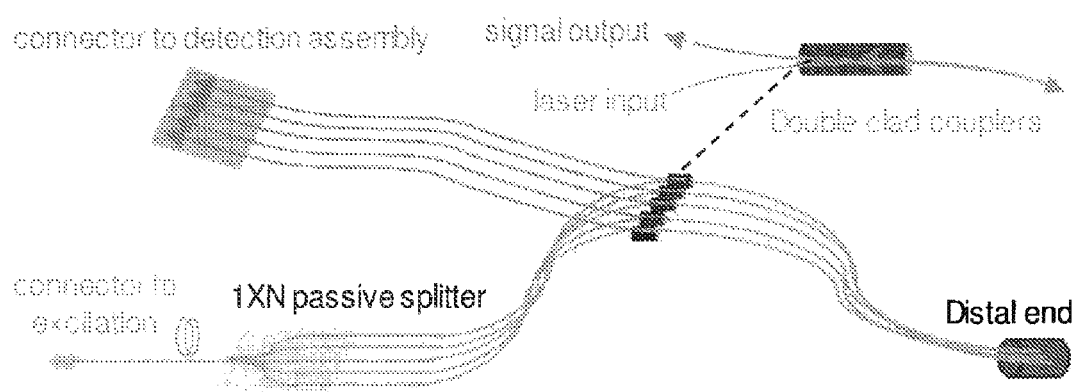
FIG. 15 shows an optical schematic of a fiber optic scanning system for five parallel excitation and collection paths, according to an illustrative aspect of the invention.

As shown in FIG. 14a, the distal end of the fiber array 1403 is a monolithic construct having a width and thickness of 1.2 mm and 125 µm, respectively, that encases 10 dispersion-compensated fibers (DCFs) $1458_{1\text{-}10}$. As used herein, the term "monolithic" means that at least the distal end of the fiber array moves (e.g., scans) 'as one'. Accordingly, the 'monolithic construct' illustrated in FIG. 14a is illustrative but non-limiting; i.e., the distal end of the fiber array may be made 'monolithic' by different structures such as, but not limited to, a harness, a bundle arrangement, a solid enclosure, or other structural means. The thickness of the illustrated monolithic fiber array was chosen so that its lowest mechanical resonant frequency was ~1.5 KHz, allowing a bi-directional line-scan rate of ~3 kHz. This lowest-order resonance frequency is independent of the array width (i.e., y-dimension), and air damping is negligible for the dimensions shown in FIG. 14a. At the proximal end, the fiber array breaks out into 10 DCFs as illustrated in FIG. 15, making it mechanically flexible and providing easy access to each channel. Since 10 foci are scanned and detected simultaneously, the aggregated line rate is ~30 kHz, allowing 40 frames/s at 750×750 pixels/frame. In addition, the maximum scan range of the slow axis (y-axis) only needs to cover the fiber-to-fiber distance; therefore, the piezo-driven raster scanner has an overall length of only seven (7) mm (i.e., ~10 mm shorter than that shown in FIG. 8c).

To further increase the FOV, a miniature fiber lens as described above, can be fabricated at the tip of each fiber (see FIG. 14a) using laser processing tools. In an exemplary aspect, the fiber lens will have a radius of curvature ~5 µm to reduce the beam size at the output of the DCFs by approximately a factor of two (with a corresponding increase in its NA). By reducing the spot size, a smaller de-magnification (~0.5) is required for the distal optics to achieve sub-µm resolution at the sample, leading to an increased FOV without increasing the fiber-array scan range. The combination of the fiber array and the fiber lens will enable a remarkably large FOV of 600 µm in a small microscope. Fiber lenses with radii of curvature of 4 µm and 6 µm were successfully fabricated at the tips of SMFs and DCFs.

Axial sectioning is required for a practical laser scanning microscope. In the illustrative aspect, multiple z-sections can be acquired without any mechanical motion at the distal end of the monolithic fiber-array scanner where each fiber has a pre-determined axial offset. Since the tip of the fiber array is directly imaged onto the sample by the distal optics (magnification ~0.5), an axial (z-axis) offset in the fiber tip will translate into different focal depth in the sample. FIG. 13a shows one possible implementation where the 10 foci of the fiber array are divided into two groups, each group providing five discrete z-sections with ~10 µm axial separation (i.e., approximately the axial resolution of the microscope) in the sample. Different configurations are possible, with up to 10 z-sections depending on clinical needs. Since the 10 foci are scanned simultaneously, the frame-rate improvement will remain the same (10×); however, such an increase in frame rate is now distributed between the lateral (y) and axial (z) directions.

In the embodied design, there is a tilt or lateral offset of the image planes in the z-stack because of the lateral separation of the fiber tips (i.e., in the y-direction). We believe such a tilt may not have any practical impact in clinical diagnostics: (1) in our studies on MPM of ex vivo human tissues (bladder, prostate, lung, etc.), isolated z-sections, not the full z-stack, were used for diagnostic purposes; (2) the amount of the tilt is known and can be calibrated since the offsets in y and z are determined by the fiber-array scanner. In addition, the effect of the tilt can be reduced by increasing the lateral scan range (at a slightly increased rigid length (e.g., from 7 to 10 mm) of the piezo scanner) as illustrated in FIG. 13b, or removed from acquired images via image post-processing techniques. Considering the precision, compactness, and speed enabled by the remote axial sectioning mechanism, we believe such a tilt is will not significantly impact the diagnostic performance of the microscope.

The embodied microscope further includes a microscope objective lens to image the fiber array onto the tissue. The lens was designed using commercially available software (ZEMAX) and the layout is shown in FIG. 14c. The design wavelength is 780 nm. The exemplary system consists of one spherical and two aspherical lenses. The lens had a NA of 0.5, a magnification of 0.5, and an O.D. of 2 mm. The FWHM of the point-spread-function (PSF) is ~0.8 um across the FOV, which is ~600 um. The Strehl ratio is well above 0.9 indicating nearly diffraction limited performance.

The disclosed distal optics and the remote sectioning mechanism are ideally suited for a flexible microscope (e.g., an endoscope). For a rigid microscope (e.g., a laparoscope), z-scan can be performed at the proximal end of the microscope, making conventional focusing mechanisms (e.g., piezo, stepper motor, etc.) well suited for this purpose.

FIG. 15 shows the design of an exemplary fiber-optic system that can connect the distal end to a laser and detector assembly. A simple lxN passive splitter divides the excitation beam into N SMFs. Double clad couplers (DCCs) connect the SMFs with the DCFs of the fiber-array scanner. The DCCs separate the single-moded excitation beam from the multi-moded fluorescence/SHG signal. The multimode fibers carry the signal to the detection assembly (e.g., multianode PMTs). The embodied design eliminates a number of free-space components in the detection path that are integral to a canonical MMM system (e.g., the microlens array, dichroic mirrors, lenses, etc.) leading to a more compact, flexible, and robust system. The modular design also allows convenient separation between the fiber optics and the rest of the microscope system. For example, the fiber optic system can easily be detached from the excitation source and the detection optoelectronics, greatly simplifying the cleaning and sterilization procedure. Dispersion compensation is necessary for femtosecond-pulse delivery. The design of the fiber optic system allows a single dispersion compensation setup to compensate for all 10 channels, as long as the lengths of the fibers are reasonably matched (e.g., within ~1 cm for a pulse width of ~100 fs). Such a length requirement can be achieved with routine fiber cleaving and splicing.

Figure 16:
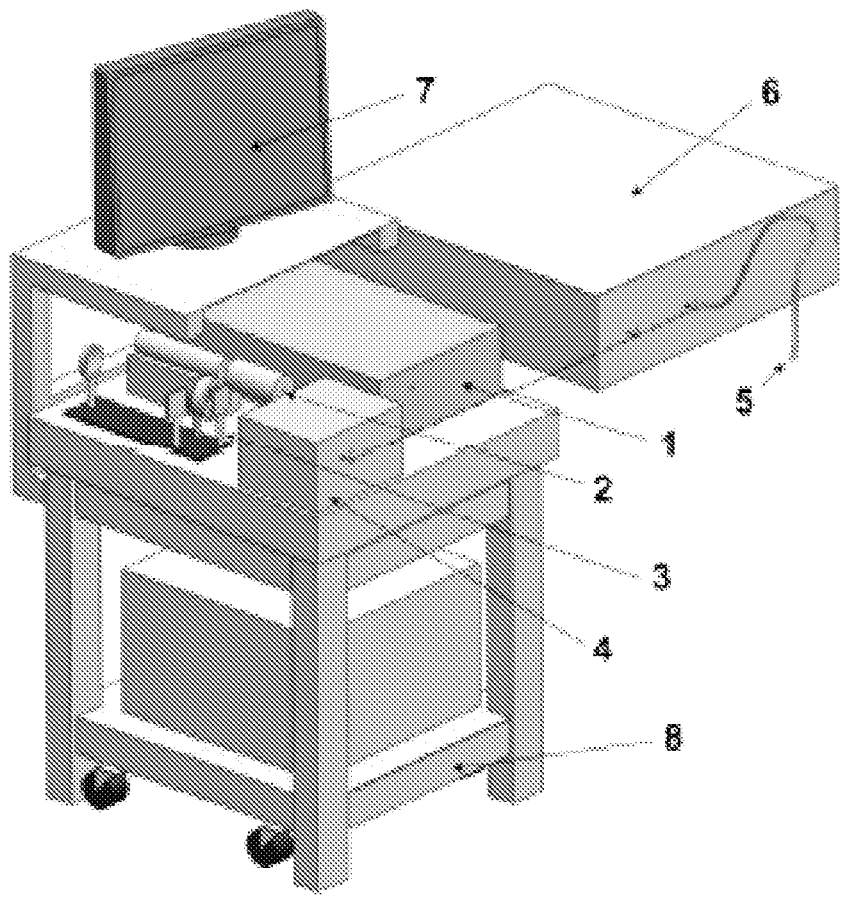
FIG. 16 shows a clinical laser scanning microscope system, according to an illustrative aspect of the invention.

An illustrative clinical laser scanning microscope system is illustrated in FIG. 16. The system includes a Ti:Sapph laser (1), an optical power modulation system (2), dispersion compensation optics (3), detector assembly (4), fiber optic connectors with the flexible microscope (5), a waterproof enclosure (6), a display (7), and a vibration-isolated work station (8) with retractable wheels. The dimensions of the illustrative system are 28 in. (W)×33 in. (D)×50 in. (H).

Detection of the laser scanning excited fluorescence and the second and third harmonic of the laser excitation generated in the tissue can be accomplished by endoscopy and optical biopsy through the segment that provides the excitation and signal path and through additional surrounding fibers in a bundle or through thicker optical tubes for efficient collection of light that is excited near the tip of a single mode excitation fiber or fibers. There is a significant advantage in fluorescence collection efficiency for multiphoton microscopic tissue fluorescence over single photon excitation, because the emission is localized near the tip of the optical fiber where it is most accessible to the coaxial optical instrumentation. The same advantage applies in optical biopsy needle environments.

Effective multiphoton molecular excitation is made possible by the combination of both the very high, local, instantaneous intensity and the temporal concentration of a pulsed laser light source. For example, a high intensity IR source such as a titanium sapphire mode locked solid state laser, with pulse duration of about 100 fs ($100 \times 10^{-15}$ seconds) and a pulse repetition rate of 80 MHz may advantageously be used. Pulses of light having a wavelength between about 700-1000 nm, or with the pulses having a width of $10^{-9}$ seconds to $10^{-15}$ seconds are advantageously suitable. Other lasers that are also effective for multiphoton excitation and harmonic generation can also be used. These lasers may be used to produce light at different relatively long wavelengths in the infrared or visible red region of the spectrum, for example, to generate the necessary excitation photon energies that will add up to the appropriate absorption energy band required by the fluorophores in the spectrum that normally would be excited by absorption of a single photon in the spectral region having wavelengths about one-half the wavelength of the incident light. If shorter excitation wavelengths are needed, the laser wavelengths can be divided by 2, 3, or 4 by external harmonic generation. Thus, for example, two photons in the visible red region at 750 nm would combine to excite a fluorophore that normally absorbs light in the ultraviolet region at or above 375 nm, while two photons in the infrared region of, for example, 1070 nm, would excite a fluorophore which absorbs at or above 535 nm in the visible light region. These fast pulses are directed through the microscope or optical biopsy needle to target tissue material or to a tissue specimen. Because of the high instantaneous power provided by the very short duration focused pulses, there is an appreciable probability that a fluorophore (a fluorescent dye or an endogenous fluorophore), contained in the target tissue material, and normally excitable by a single high energy photon having a short wavelength, typically ultraviolet, will absorb two long wavelength photons from the laser source simultaneously. This absorption combines the energy of the two photons in the fluorophore molecule, thereby raising the fluorophore to its excited state. When the fluorophore returns to its normal state, it emits light, and this light then passes back through the microscope or optical biopsy needle to a suitable detector.

In addition to measurement of intrinsic tissue fluorescence with multiphoton excitation, it is possible to utilize the fluorescence of drugs to detect their location in tissue. Often, such drugs segregate to particular tissue structures or disease products, such as tumors. Multiphoton excitation can be used to identify them. Many important drugs absorb ultraviolet light to become fluorescent and are, therefore, effectively excited by multiphoton excitation. As a result, all of the advantages of multiphoton excitation of intrinsic tissue fluorescence together with the labeling features provided by the selective segregation or binding of fluorescence drugs are achieved. For example, the principal drug used to treat colitis, 5-amino salicylic acid, can be imaged in all of the layers of living colon tissue explants as the drug is metabolized. It can be located relative to complex tissue structure by imaging tissue autofluorescence due to collagen, nicotinamide adenine dinucleotide (NADH), and other structures. Multiphoton excitation of such drugs can be observed in vivo within tissues by multiphoton endoscopy and/or multiphoton optical biopsy.

Photoactive agents including fluorescent dyes are commonly used in multiphoton microscopy to image properties of cells and tissues. Suitable photoactive agents include dyes which are excited by multiphoton excitation such as, organic molecules whose fluorescence changes when they bind metal ions such as $Ca^{2+}$, $Mg^{2+}$, $Na^+$, $K^+$, or $H^+$. Dyes that bind to the DNA double helix such as DAPI (4',6-diamidino-2-phenylindoledihydrochloride) are particularly useful. Many such dyes are suitable for application in vivo.

Fluorescence distribution may also be probed by multiphoton absorption microscopic spectroscopy in living animals, including humans, to recognize inflammatory disease such as colitis and to follow the progress of its treatment. The distribution of fluorescent protoporphyrin IX, the metabolic product of aminolevulinic acid, which accumulates in cancer cells, would similarly be useful in cancer detection. NADH fluorescence may be the most promising cancer signal accessible by multiphoton absorption microscopic spectroscopy, but it must be spatially localized by multiphoton absorption to distinguish it from other sources including collagen, which can be similarly fluorescent in adjacent tissues. Certain tissues and tissue components, particularly collagen, an important structural component of tissue that appears in many forms, are very effective at generating the second harmonic of bright coherent illumination. The second harmonic of illumination has exactly half of the wavelength and thus twice the photon energy of the fundamental illumination. Similarly, the third harmonic of illumination has exactly one third of the wavelength and, therefore, three times the photon energy. Generation of second harmonic radiation has been demonstrated to be a useful phenomenon for microscopic imaging of cells. Because the illumination conditions required to excite second or third harmonic in complex tissue are nearly the same as for multiphoton fluorescence excitation, it is possible to take advantage of second or third harmonic generation, in tissues such as collagen, to complement multiphoton excitation of intrinsic tissue fluorescence. In complex tissues, the second or third harmonic radiation is frequently radiated through broad angles that make it detectable along with the multiphoton excited fluorescence.

The apparatus and method of the present invention may be used for a variety of purposes. For example, histological and clinical composition, structure, metabolic state, and vitality in the region of the subject can be determined. Alternatively, functional response to physiological and pharmacological stimuli and disease states can be detected in the region of the subject. Further, tissue or drug fluorescence excitation and emission spectra, luminosity, fluorescence lifetime, and temporal fluctuations in the region of the subject may also be determined.

The external geometries of urological microscope (including endoscope, laparoscope, and surgical microscope) configurations for imaging and biopsy in the bladder include outside diameters of approximately 4.5 mm and 8 mm. An optical tube may contain a series of rod lenses that illuminate an area on the inside of the bladder wall for low magnification surface imaging and collect backscattered and reflected light from tissue surfaces and deliver the light to an eyepiece or camera. A small tube for fluid perfusion and insertion of wire catheters and other catheters may also be included. An microscope aspect of the present invention includes a fiber input for pulsed infrared laser light for MPM and white light for low magnification illumination, as well as a light pipe guiding both sources of the imaging light to an imaging detector, such as a PMT or the like.

All references, including publications, patent applications, and patents cited herein are hereby incorporated by reference in their entireties to the extent allowable and to the same extent as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The recitation of ranges of values herein is merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the embodiments without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. An optical scanner, comprising:
a first drivable bending component having a first component bending axis and a first component driven bending axis direction;
a second drivable bending component having a second component bending axis and a second component driven bending axis direction,
wherein the first and second drivable bending components are coupled such that their respective driven bending axis directions are different; and
at least one optical waveguide coupled to at least one of the first and second drivable bending components parallel to the first and second component bending axes, such that the at least one waveguide can be moved in at least one of the driven bending axis directions.

2. The optical scanner of claim 1, wherein the at least one optical waveguide provides both a propagation path for a multiphoton excitation radiation delivery between a light source and a target and a multiphoton-induced emission radiation delivery between the target and a detector.

3. The optical scanner of claim 2, wherein the at least one optical waveguide further provides a propagation path for visible target illumination light.

4. The optical scanner of claim 1, wherein the first and second drivable bending components are multi-layer piezo-actuators.

5. The optical scanner of claim 1, wherein the first and second drivable bending components are coupled such that their respective driven bending axis directions are perpendicular.

6. The optical scanner of claim 1, wherein the at least one optical waveguide is an optical fiber mounted to the at least one of the first and second drivable bending components.

7. The optical scanner of claim 6, wherein the at least one optical fiber has a distal, light-emitting end that extends past a respective attachment surface of the first and second drivable bending components.

8. The optical scanner of claim 7, wherein the distal, light-emitting end of the optical fiber includes a lens having a radius of curvature, r.

9. The optical scanner of claim 8, wherein 4 µm≤r≤6 µm.

10. The optical scanner of claim 7, wherein the distal, light-emitting end of the optical fiber includes an aspheric lens.

11. The optical scanner of claim 7, wherein the at least one optical fiber has a proximal end that provides an input from a light source, further comprising at least one optical coupler and at least one output signal optical waveguide coupled to the at least one optical fiber via the at least one optical coupler.

12. The optical scanner of claim 11, wherein the at least one optical coupler is a double-clad coupler.

13. A microscope comprising the optical scanner of claim 12.

14. The optical scanner of claim 7, wherein the distal, light-emitting end of the optical fiber has a driven displacement in the first component driven bending axis direction equal to or greater than one millimeter (1 mm) and a driven displacement in the second component driven bending axis direction equal to or greater than 0.5 mm.

15. The optical scanner of claim 14, wherein the distal, light-emitting end of the optical fiber has a resonantly-driven displacement in the first component driven bending axis direction and a non-resonantly-driven displacement in the second component driven bending axis direction.

16. The optical scanner of claim 7, further comprising a stiffening component attached to one of the first and second drivable bending components and an extending region of the optical fiber.

17. The optical scanner of claim 7, wherein the distal, light-emitting end region of the optical fiber has a taper.

18. The optical scanner of claim 17, wherein the distal, light-emitting end of the optical fiber includes a spherical or an aspheric lens.

19. The optical scanner of claim 17, wherein the distal, light-emitting end of the optical fiber has an adiabatic taper.

20. The optical scanner of claim 6, wherein the at least one optical fiber is a double-clad fiber.

21. The optical scanner of claim 6, wherein the at least one optical fiber is an air-core photonic bandgap fiber (PBGF).

22. The optical scanner of claim 6, wherein the at least one optical fiber is a high-order-mode fiber (HOMF).

23. The optical scanner of claim 6, wherein the at least one optical fiber is a standard single-mode fiber (SSMF).

24. The optical scanner of claim 1, further comprising a scanner housing in which the scanner is disposed.

25. The optical scanner of claim 24, further comprising an objective optical system disposed in a distal region of the scanner housing.

26. The optical scanner of claim 25, further comprising a gradient index (GRIN) lens system disposed in a rigid housing coupled to a distal end of the scanner housing.

27. The optical scanner of claim 26, wherein the GRIN lens system includes a plurality of GRIN relay lenses and a GRIN objective lens.

28. A microscope comprising the optical scanner of claim 26.

29. The microscope of claim 28, wherein said microscope is selected from the group comprising surgical microscopes, laparoscopes, and endoscopes, including pharyngoscopes, esophagoscopes, gastroscopes, duodenoscopes, enteroscopes, colonoscopes, sigmoidoscopes, cholangioscopes, rhinoscopes, antroscopes, laryngoscopes, bronchoscopes, nephroscopes, ureteroscopes, cystoscopes, gynoscopes, colposcopes, hysteroscopes, falloposcopes, culdoscopes, arthroscopes, thoracoscopes, mediastinoscoes, coelioscopes, amnioscopes, angioscopes, otoscopes, ventriculoscopes, benchtop microscopes, and boroscopes.

30. The optical scanner of claim 1, comprising at least two optical waveguides coupled to at least one of the first and second drivable bending components parallel to the first and second component bending axes.

31. The optical scanner of claim 30, wherein the at least two optical waveguides are optical fibers having respective distal, light-emitting ends that extend past a respective attachment surface of the first and second drivable bending components.

32. The optical scanner of claim 31, wherein the at least two optical fibers have proximal ends that provide inputs from a light source, further comprising at least two respective optical couplers and at least two respective output signal optical waveguides coupled to the at least two optical fibers via the at least two respective optical couplers.

33. The optical scanner of claim 32, further comprising a connector connected to the proximal ends of the least two optical fibers, and a connector connected to the proximal ends of the at least two respective output signal optical waveguides, wherein the scanner is a modular component and is detachably connectable to an optical excitation source and a signal light detector.

34. A microscope comprising the optical scanner of claim 33.

35. The microscope of claim 34, wherein said microscope is selected from the group comprising surgical microscopes, laparoscopes, and endoscopes, including pharyngoscopes, esophagoscopes, gastroscopes, duodenoscopes, enteroscopes, colonoscopes, sigmoidoscopes, cholangioscopes, rhinoscopes, antroscopes, laryngoscopes, bronchoscopes, nephroscopes, ureteroscopes, cystoscopes, gynoscopes, colposcopes, hysteroscopes, falloposcopes, culdoscopes, arthroscopes, thoracoscopes, mediastinoscoes, coelioscopes, amnioscopes, angioscopes, otoscopes, ventriculoscopes, benchtop microscopes, and boroscopes.

36. The microscope of claim 35, wherein said microscope is selected from the group comprising surgical microscopes, laparoscopes, and endoscopes, including pharyngoscopes, esophagoscopes, gastroscopes, duodenoscopes, enteroscopes, colonoscopes, sigmoidoscopes, cholangioscopes, rhinoscopes, antroscopes, laryngoscopes, bronchoscopes, nephroscopes, ureteroscopes, cystoscopes, gynoscopes, colposcopes, hysteroscopes, falloposcopes, culdoscopes, arthroscopes, thoracoscopes, mediastinoscoes, coelioscopes, amnioscopes, angioscopes, otoscopes, ventriculoscopes, benchtop microscopes, and boroscopes.

37. The optical scanner of claim 31, wherein the respective distal ends of the at least two optical fibers have different extending distances.

38. The optical scanner of claim 37, wherein the respective distal ends of the at least two optical fibers include respective lenses.

39. The optical scanner of claim 38, wherein the lenses are spherical or aspherical.

40. The optical scanner of claim 31, wherein the respective distal ends of the at least two optical fibers have a taper.

41. The optical scanner of claim 40, wherein the respective distal ends of the at least two optical fibers include respective lenses.

42. The optical scanner of claim 41, wherein the lenses are spherical or aspherical.

43. The optical scanner of claim 31, wherein the at least two optical fibers are an M×N (M≥1, N≥2) monolithic array in a distal region thereof.

44. The optical scanner of claim 43, characterized by having multiple foci in both a lateral (y)-direction and an axial (z)-direction.

45. The optical scanner of claim 43, wherein the monolithic array comprises a 1×N array, where N=10 optical fibers.

46. The optical scanner of claim 43, wherein the respective distal ends of the at least two optical fibers include respective lenses.

47. The optical scanner of claim 46, wherein the respective lenses are different, thereby providing a plurality of focal planes.

\* \* \* \* \*